(12) United States Patent
Verma

(10) Patent No.: US 10,288,320 B2
(45) Date of Patent: May 14, 2019

(54) LOW COST HIGH EFFICIENCY SOLAR POWER PLANT

(71) Applicant: Subodh Verma, New Delhi (IN)

(72) Inventor: Subodh Verma, New Delhi (IN)

( * ) Notice: Subject to any disclaimer, the term of this patent is extended or adjusted under 35 U.S.C. 154(b) by 551 days.

(21) Appl. No.: 14/634,423

(22) Filed: Feb. 27, 2015

(65) Prior Publication Data

US 2015/0184894 A1      Jul. 2, 2015

Related U.S. Application Data

(63) Continuation-in-part of application No. PCT/IB2013/058302, filed on Sep. 5, 2013.

(30) Foreign Application Priority Data

Sep. 6, 2012   (IN) ............................ 2769/DEL/2012

(51) Int. Cl.
*F24J 2/12*       (2006.01)
*F24S 50/20*     (2018.01)
(Continued)

(52) U.S. Cl.
CPC .............. *F24S 50/20* (2018.05); *F03G 6/067* (2013.01); *F24S 10/00* (2018.05); *F24S 10/70* (2018.05); *F24S 20/20* (2018.05); *F24S 23/70* (2018.05); *F24S 23/71* (2018.05); *F24S 23/82* (2018.05); *F24S 25/12* (2018.05); *F24S 30/45* (2018.05); *F24S 40/20* (2018.05); *F24S 40/40* (2018.05); *F24S 40/50* (2018.05); *F24S 80/30* (2018.05); *F24S 80/50* (2018.05); *F24S 80/60* (2018.05); *F28D 20/0056* (2013.01); *Y02A 40/227* (2018.01); *Y02E 10/41* (2013.01); *Y02E 10/42* (2013.01); *Y02E 10/46* (2013.01); (Continued)

(58) Field of Classification Search
CPC ...... F24J 2/04; F24J 2/10; F24J 2/1052; F24J 2/1057; F24J 2/12; F24J 2/125; F24J 2/145; F24J 2/24; F24J 2/38; F24J 2/50
See application file for complete search history.

(56) References Cited

U.S. PATENT DOCUMENTS

2011/0226780 A1   9/2011   Bell et al.
2011/0247679 A1   10/2011  Shelef et al.
(Continued)

FOREIGN PATENT DOCUMENTS

DE    202010004116    8/2010
DE    202010007564    9/2010
(Continued)

*Primary Examiner* — Jonathan Matthias
(74) *Attorney, Agent, or Firm* — Roy Kiesel Ford Doody & Thurmon, APLC

(57) ABSTRACT

The present invention relates to a system and apparatus which is designed to use parabolic concentrator to focus sunlight onto a receiver which uses a coolant to carry the heat to the heat storage unit. The system comprises a primary loop comprising at least one solar array and at least one heat storage unit. The system further comprises a secondary loop operatively communicating with said primary loop. The solar array comprises plurality of reflector dish assemblies comprising reflector dish means whereby said dish means are arranged in close proximity to each other wherein said dish means being such that high sunlight concentration ratio is obtained for providing high conversion efficiency from heat to electricity.

31 Claims, 16 Drawing Sheets

(51) Int. Cl.
> *F24S 10/00* (2018.01)
> *F24S 23/70* (2018.01)
> *F24S 10/70* (2018.01)
> *F03G 6/06* (2006.01)
> *F28D 20/00* (2006.01)
> *F24S 23/71* (2018.01)
> *F24S 80/60* (2018.01)
> *F24S 80/30* (2018.01)
> *F24S 40/50* (2018.01)
> *F24S 80/50* (2018.01)
> *F24S 20/20* (2018.01)
> *F24S 40/40* (2018.01)
> *F24S 25/12* (2018.01)
> *F24S 30/45* (2018.01)
> *F24S 40/20* (2018.01)

(52) U.S. Cl.
> CPC .............. *Y02E 10/47* (2013.01); *Y02E 60/142* (2013.01); *Y02E 70/30* (2013.01)

(56) References Cited

U.S. PATENT DOCUMENTS

| | | |
|---|---|---|
| 2011/0259422 A1 | 10/2011 | Finot |
| 2012/0073567 A1 | 3/2012 | Winston |
| 2013/0298897 A1 | 11/2013 | Kawane et al. |

FOREIGN PATENT DOCUMENTS

| | | |
|---|---|---|
| DE | 102010038858 | 2/2012 |
| EP | 2256428 | 12/2010 |
| WO | 7901003 | 11/1979 |
| WO | 9506846 | 3/1995 |
| WO | 2008109746 | 9/2008 |
| WO | 2010029411 | 3/2010 |
| WO | 2010088632 | 8/2010 |
| WO | 2011047231 | 4/2011 |
| WO | 2011130695 | 10/2011 |
| WO | 2011149554 | 12/2011 |
| WO | 2012004435 | 1/2012 |
| WO | 2012073665 | 6/2012 |

LOW COST HIGH EFFICIENCY SOLAR POWER PLANT

PRIORITY CLAIM

This application is a continuation-in-part of International Application No. PCT/IB2013/058302 filed on Sep. 5, 2013, published as WO 2014/037892 on Mar. 13, 2014, and of Indian Patent Application No.: 2769/DEL/2012 filed on Sep. 6, 2012, which are all hereby incorporated by reference in their entirety.

FIELD OF THE INVENTION

The present invention relates to a very low cost yet high efficiency system and apparatus which is designed to use parabolic concentrator to focus sunlight onto a receiver which uses a coolant to carry the heat to the heat storage unit. A secondary loop using water as the coolant draws heat from the heat storage unit and is used to run a turbine to generate electricity. The waste heat from the secondary loop can further be used to run a desalination plant, or simply lost to the environment.

BACKGROUND OF THE INVENTION

Currently there are several systems which have been developed or are under development for converting sunlight into electricity. A brief description of these systems along with their advantages and disadvantages are given below in order to give a better understanding of solar power.
1) Parabolic trough: This is one of the first systems that was developed and is still one of the favourite means being pursued in certain countries. In this system, a parabolic trough has a tube running through the focal-point. This tube has a coating which absorbs light efficiently. A high-temperature oil passes through this tube and is heated by the concentrated sunlight. This heated oil is then used to heat water into a superheated vapour which is used to drive a steam turbine which in turn drives a generator to produce electricity. A sun tracking system is used to track the position of the sun and a motor system is used to rotate the entire parabolic dish and associated pipes. The advantages of this system are that a single axis tracking is sufficient to follow the sun. It does have a major limitation which is that the maximum temperature that can be achieved is quite low since the long pipes re-radiate energy. Since radiation is proportional to the fourth power of absolute temperature, beyond a certain temperature, the receiver pipes start radiating as much energy as they receive. Thus such system is found to be not efficient enough.
2) Power tower: In this system, flat mirrors are used instead of parabolic ones. The receiver is placed on top of a high central tower and all the mirrors are positioned in such a manner that they reflect the sunlight onto this central tower receiver. The advantage of the system is that it is possible to achieve much higher temperatures than is possible in the parabolic trough system and, therefore, much higher efficiency. This system also has the advantage of having much less piping. The disadvantages are that each mirror has to follow the sun in a specific manner so as to focus the light on to the receiver at the top of the central tower. The height of the tower also increases with the size of the solar array which increases the cost. The biggest disadvantage is that a lot of the mirrors would be tilted at an angle during peak sunlight hours and, therefore, not maximizes energy collection during the time of maximum sunlight. The receiver also has a large surface area which re-radiates very large amounts of energy, which limits the maximum temperature of operation.
3) Parabolic dish: The current design for parabolic dish systems consists of a large parabolic dish which focuses sunlight onto a Stirling engine which is used to directly convert heat into electricity. This design allows for very high temperatures and therefore higher efficiencies than the parabolic trough system. The problem with the systems in current designs is that they end of being very expensive and have a lot of individual parts resulting in requirement of high maintenance.
4) Photovoltaic systems: These systems directly convert light into electricity using the photovoltaic effect. The drawback with these systems is the high starting cost along with low efficiencies. Another problem is that of storing electricity which is much more difficult, expensive and polluting then storing heat.
5) WO/2012/128877 describes an enclosure, such as a greenhouse, which encloses a concentrated solar power system having line-focus solar energy concentrators. The line-focus solar energy concentrators have a reflective front layer, a core layer, and a rear layer. The core and the rear layers, when bonded with the reflective front layer, enable the line-focus solar energy concentrator, in some embodiments, to retain a particular form without additional strengthening elements. In some embodiments, the core layer is a honeycomb layer. In some embodiments, the core layer and/or the rear layer are formed by removing material from a single piece of material.
6) Others systems: There are various other systems in experimental stages which are unlikely to achieve much success for technical reasons and will, therefore, not be discussed here.

The biggest problem faced by mankind today is a continuous burning of fossil fuels to provide energy. This has resulted in a situation where the carbon dioxide in the atmosphere has been steadily increasing at an exponential rate. This is resulting in global warming that'll be very detrimental unless the burning of fossil fuels is stopped immediately. In the absence of a cheap alternative source of energy, this is not going to happen. The only source of power which can provide all the energy needs of the planet is solar energy. The present intention is not only to provide an alternative to electricity generation but also to ensure that all automobiles and other machines, heating of homes during winter and any other the energy requirements are all provided only through renewable sources such as solar. In short, human beings will provide absolutely no further carbon pollution of this planet. Only then will we be able to ensure that this planet will be able to sustain life until the Sun goes supernova. The only way this is going to happen is with a design that is cheap, easy to mass produce, low maintenance, highly efficient, highly mechanised requiring little human intervention, and has a 30 to 50 year plant life.

The most important consideration to the success or failure of any project is the price of the final product. No matter how many benefits solar power may have over fossil fuels or other technologies, there is little chance of success if the price of solar power is more than that of other power sources. It is, therefore, imperative to design a solar power plant which can provide unsubsidized power at a rate which is cheaper or equal to that of any fossil fuel.

OBJECT OF THE INVENTION

A basic object of the present invention is to overcome the disadvantages/drawbacks of the known art.

Another object of the present invention is to provide an efficient system for electrical power generation and heat storage.

Another object of the present invention is to provide a plant for generating electricity from solar power in an efficient manner.

Another object of the present invention is to provide a simple and cost effective arrangement in the system and plant as described above.

Another object of the present invention is to provide efficient and cheap heat storage unit.

Another object of the present invention is to provide a simple and cost effective structure for receiving the sunlight.

Another object of the present invention is to provide proper insulation to the system for minimizing heat loss.

Another object of the present invention is to provide an automatic dust removal and cleaning system.

Another object of the present invention is to minimize water requirement to almost nil as water is rarely in abundant supply in most deserts.

These and other advantages of the present invention will become readily apparent from the following detailed description read in conjunction with the accompanying drawings.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

A basic layout of the plant is shown in FIG. 1. The section containing the secondary loop consisting of a turbine, generator and condensing unit are the same as any other power plant e.g. Nuclear, gas, coal, and will, therefore, not be discussed. My design is entirely focused on the section of the primary loop consisting of the solar array and the heat storage unit. The basic focus in designing the solar array has been to select a design which can achieve a high efficiency, is easily manufactured using low cost materials, has a long life, requires low maintenance, and can run for the entire life of the plant with very little human intervention. Since solar plants will always be set up in deserts where the environment is very dusty and has high wind speeds due to the flat open landscape, any successful design will have to be unaffected by these conditions.

Equally important is to design an effective and cheap heat storage unit which will ensure that the plant can operate at full capacity throughout the year regardless of the environmental conditions. At present, most of existing solar plants have been designed with storage units which can provide only a few hours of backup, which is not even remotely acceptable. Even in a desert, one must accept that there may always be periods that may extend for several days when sunlight will not be available due to clouds, dust storms or technical reasons. Since my intention is to ensure that all forms of energy requirements are met only through solar or other renewable means they can be no backup using fossil fuels. Therefore, any heat storage unit of the solar plant should be capable of providing full capacity power even in the event that there was no sunlight for a period of several days or longer.

Another technical challenge that solar power plants will face will be the great difference in energy that is available in summers as compared to winters. The demand for energy in winters can be quite significant especially in countries that enjoy harsh winters. In the event that a city is reasonably close to a solar power plant (say a few hundred kilometers) thermal energy could be directly taken from the waste heat from the secondary loop. The advantage of this would be that they would be the little wastage of energy. However, the odds are that most of the cities would be much farther away from the solar power plant and would, therefore, have to use electricity for heating and cooking purposes. Considering that the useable energy available from the sun in winter's may only be 50 per cent or less than that available in summers, in those locations that are far from the equator, the only options available would be to build significant over capacity, or to build a heat storage unit sufficiently large as to be able to cover any shortfall due to sunlight deficiency in winter's. This is economically not practical. A simple solution would be to build all the plants reasonably close to the equator, say within 40° north of south of the Equator, and transmit electricity through high tension wires to other regions.

It is also very likely that most of the solar plants will be located far from oceans and will have very little access to any type of water. Therefore, most of the plants will be air cooled. Other then the fact that cooling towers use very large amounts of water which will simply not be available, it is also required to be considered that a very large size solar array would significantly drop the temperatures in that area. It is for this reason that air cooling would actually be quite beneficial as the air temperature could be maintained in the desired range. This would result in a slightly higher initial investment and slightly lower efficiency, but in most cases, there may be no choice.

A final consideration that is also very important is that the entire plant and heat storage unit should be constructed in such a fashion has to be highly environmentally friendly. In other words, minimum energy should be required to manufacture all the components of the plant, no toxic chemicals should be used, and all components of the plant should be fully biodegradable or reusable at the end of the lifecycle. At any point in the future, if the plant is no longer required, the land should be left in the same or better condition as it was before the plant was built. It is with all the above mentioned concerns that the plan described below has been designed.

Thus in one aspect the present invention relates to a system for electrical power generation and storage at high temperatures in the range of 700-1000° K or more, said power being generated from solar energy wherein said system comprising:

a primary loop, said primary loop comprising at least one solar array and at least one heat storage unit whereby said heat storage unit being adapted to receive and store generated power from the said solar array;

a secondary loop operatively communicating with said primary loop;

wherein said solar array comprising plurality of reflector dish assemblies comprising reflector dish means having reflective surfaces, said dish means comprising receiver means located inside a substantially transparent enclosure means with space between said receiver and the transparent enclosure being vacuum, said receiver means being hermetically protected inside the said enclosure means and adapted to receive and absorb almost all the sunlight reflected by said dish means whereby said dish means are arranged in close proximity to each other with no spacing between them with distance between focal point of receiver means and center of dish reflective surface being equal to or less than one fourth of the diameter of the dish means from the centre of the dish;

wherein said dish means optionally comprising plurality of flexible detachable portions for enhancing the conversion efficiency from heat to electricity and wherein said dish means being such that high sunlight concentration ratio is obtained with negligible re-radiation losses for providing high conversion efficiency from heat to electricity.

The system as discussed above wherein the reflector dish assembly further comprising:

one or more dual piping tubular structural members for supporting said dish means;

said structural members comprising:

two tubular support means substantially vertically arranged and spaced from each other such that said dish means is movable corresponding to position of the sun; said tubular support means being substantially hollow;

another tubular means being held substantially horizontally essentially at its both ends by said two tubular support means;

wherein each of said tubular support means comprising plural pipe means essentially concentrically disposed inside the said tubular means, said pipe means are connected in series so as to allow the hot water to pass through the tubular support means allowing for dissipation of waste heat and keeping the air temperature around the dishes above the condensation point of water;

wherein said horizontal outer tubular means comprising another inner pipe means, said inner pipe means being hermetically disposed inside a vacuum, said horizontal tubular means and joined with a receiver means located inside a substantially transparent enclosure means, said receiver means being hermetically protected inside the said enclosure means and adapted to receive and absorb almost all the sunlight reflected by said dish means;

wherein said inner pipe means having specially designed multi layer vacuum insulation arrangement all along and around in the vacuum space available between the outer surface of the said inner pipe means and inner surface of the horizontal outer tubular means and wherein said inner pipe means comprising angular bends for expansion or contraction allowance thereby eliminating need for any type of expansion or moving joints while permitting single continuous pipes by means of all welded joints in the entire dual pipe solar array and defines passage for an inert gas to flow through the said receiver means thereby carrying away the heat collected at the receiver means to the inner pipe means of next dish means of the assembly until the said inert gas reaches a desired temperature at which the said inert hot gas is sent to the heat storage unit and heat exchangers of the secondary loop.

In a further aspect the present invention resides in mechanisms whereby each of the said cleaning mechanism being provided in the said dish assembly, said cleaning mechanism comprising:

one or more arm means wherein said arm means being provided with one or more cleaning materials; and one or more motor means operatively connected to said arm means for driving said arm means as required.

In another aspect the present invention further resides in a plant comprising the system and assembly as described herein above.

In another aspect the present invention further resides in a heat storage unit adapted to operate at atmospheric pressure, said heat storage unit comprising:

a first cylindrical body or any other appropriately shaped body;

a second cylindrical body or any other appropriate shape larger than said first cylindrical body, said second cylindrical body substantially concentrically enclosing the said first cylindrical body leaving a predetermined space in-between;

plurality of metal pipe means each of which being connected to each other by fin means, said plurality of pipe means being disposed inside the said first cylindrical body in a manner to form multiple segments with the aid of said fin means for accommodating heat transfer from or to storage media.

In a further aspect the present invention resides in a small high speed energy transfer heat storage unit for use in the system and assembly as described herein above, said unit made of solid cylinder of iron/mild steel with channels to allow for flow of heat transfer medium, said heat storage unit having a pressurized cavity filled with fibrous high temperature insulation for top and bottom insulation and an iron/steel core.

Other aspects, advantages, and salient features of the invention will become apparent to those skilled in the art from the following detailed description, which, taken in conjunction with the annexed drawings, discloses exemplary embodiments of the invention.

Important Points of the Solar Array and Heat Storage Designs.

There are certain important unique features that are mentioned in the list below which give a brief idea of the design of the plant.

1) A parabolic dish of relatively small size will be used and will be die formed, or vacuum formed from a thin composite sheet of metal and acrylic, glass, PVC or plastics.
2) The dish will be an extremely light weight mirror preferably less then 1 Kg in weight.
3) Each dish will be formed in a parabolic dish shape and coated with aluminium or silver.
4) Front sided mirrors will be used with a thin protective coating of silicon dioxide. Back sided mirrors made of glass of other material can also be used with a lower efficiency.
5) There will be almost no space between the dishes.
6) Each dish will be a square shape whenever conditions allow.
7) 2 motors will control the position of each dish and they will all be controlled from a master computer.
8) The lowest point of any dish will be 1.5-2 m raised from the ground and has no contact with the ground whatsoever. This free space will be used for service purposes.
9) Even if some dishes are malfunctioning, they will not hinder others in free movement, even though the dishes have no space between them.
10) The focal point of the dishes is fixed and never moves. The dishes move around this fixed focus and are suspended in air with support rods.
11) There are no movable joints in the primary loop.
12) The primary loop will have 2 pipes. An inner pipe and an outer pipe.
13) Steel pipes of diameter 1-2 cm will form the inner pipe of the primary loop.
14) The outer pipe will be used to support the inner pipe and also the dishes.

15) The primary loop will use a gas coolant such as helium, which will not react with the inner walls of the primary loop even at high temperatures over the entire life of the plant.
16) The space between the inner and outer pipe will be a vacuum.
17) Multi-layer, thin sheet, highly reflective, thermal radiation insulation in a vacuum is used in the entire primary and secondary loop to reduce heat losses to almost nil.
18) All joints are welded for low maintenance and long life.
19) Provisions are made within the design to allow for thermal expansion and contraction.
20) If any failure occurs in the primary loop, self sealing design will ensure that only a very small section of the loop will malfunction and the plant will continue functioning at almost full capacity.
21) Very high temperatures are possible, limited only by the technical limitations of the materials available with current technologies.
22) The solar array design ensures the dishes require minimum cleaning through the entire life of the plant, which would be difficult in the current design.
23) In the event that a dish requires wet cleaning, it will be replaced with another dish and sent to an onsite cleaning facility.
24) Air ionizers will be used to charge the dust particles to ensure that the dust is removed from the air and is directed away from the dish reflective surface.
25) Air filters of the type similar but not limited to those used in air conditioners will be placed in vertical positions on all four sides of the dishes. These filters are cheap, very effective at catching dust, and are very effective at reducing air speed thereby providing wind and dust protection to the dishes and the tracking motors.
26) Any dust that evades the dust removal system and settles on the reflective surface of the dish will be removed by a rotatable robotic arm fitted with a micro-fiber cloth and a pressurised air provision.
27) For those areas where rain is very frequent, the dishes could also be enclosed in a single airtight, dust proof, and water proof housing which is effectively like a giant 'glass house'. The entire housing will be made of a very cheap, transparent, thin, clear, unbreakable, flexible material with a low index of refraction and high tensile strength.
28) The surface of the protective material can be coated with an anti-reflective coating to improve efficiencies.
29) The inside of the protective housing will have a dust free, low humidity, controlled atmosphere to reduce corrosive effects to negligible.
30) The protective housing will also serve to protect the dishes from wind.
31) The pressure inside the protective housing can be increased or decreased in the event of very high wind speeds in order to protect the structure.
32) The support structure of the primary loop pipes would also be the support of the protective housing.
33) Automated cleaning machines would continuously move on small rails provided above the support structure to clean the outside of the protective housing.
34) The design is such that a plant of any size desired can be made.
35) The coolant of the primary loop will first go to a heat storage unit.
36) The heat storage unit will use a combination of iron and sand as the energy storage medium.
37) Pipes with fins will pass through the sand which will be used to add or remove heat from the sand.
38) The heat storage unit will be in the shape of a cylinder or any other appropriate shape.
39) The sides of the cylinder and the top face will be insulated with thick high temperature insulation.
40) The bottom face of the cylinder will not be insulated. The sand itself will act as an insulator.
41) Some of the waste heat from the plant will be dissipated into the solar array. The vertical pipe supports for the primary loop are hollow and connected by pipes in series and hot water will pass through these pipes. Fins can be used to increase the heat loss as desired in these pipe supports. This will ensure that the air temperature above and below the solar array is maintained in acceptable ranges.

DESCRIPTION OF THE ACCOMPANYING DRAWINGS

The above and other aspects, features, and advantages of certain exemplary embodiments of the present invention will be more apparent from the following description taken in conjunction with the accompanying drawings in which.

Figure 15:
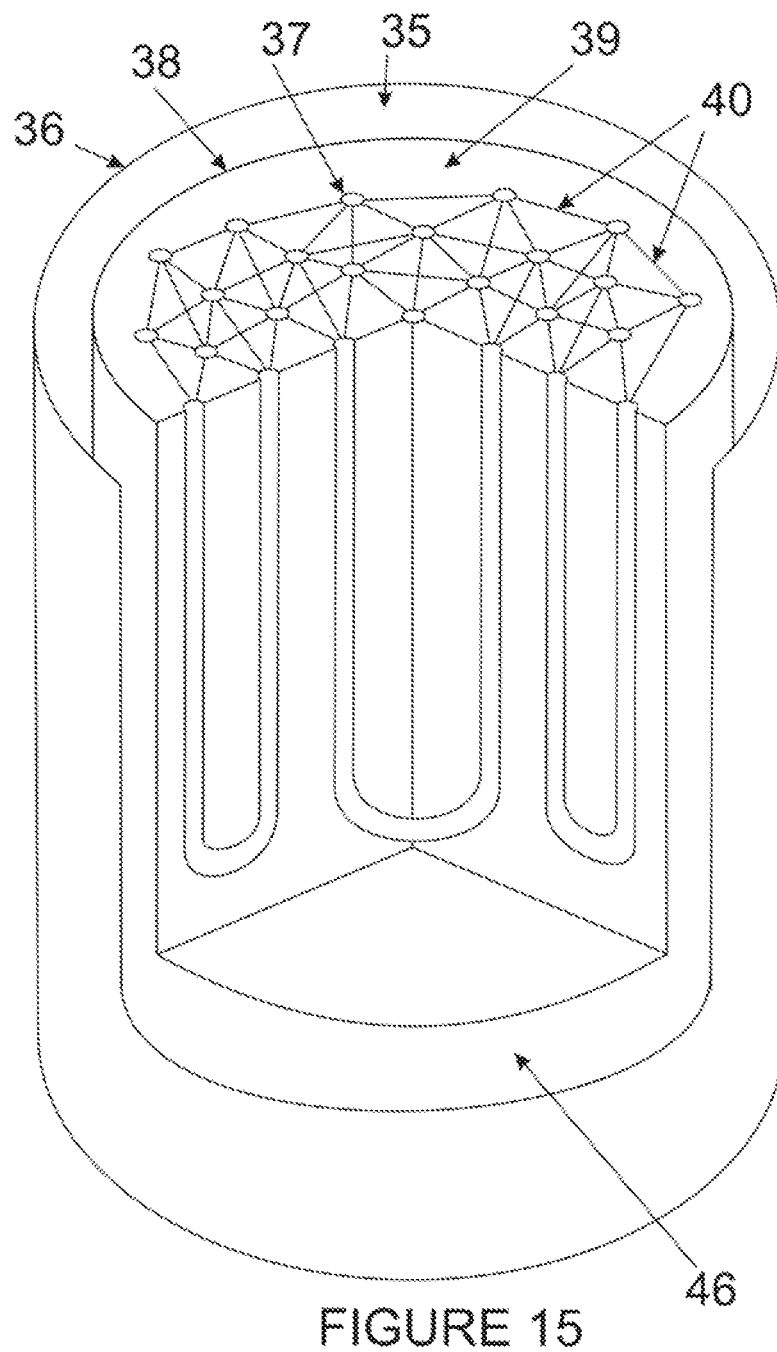

FIG. 15 again shows cut off section CC of the heat storage unit in 3D.

Figure 16:
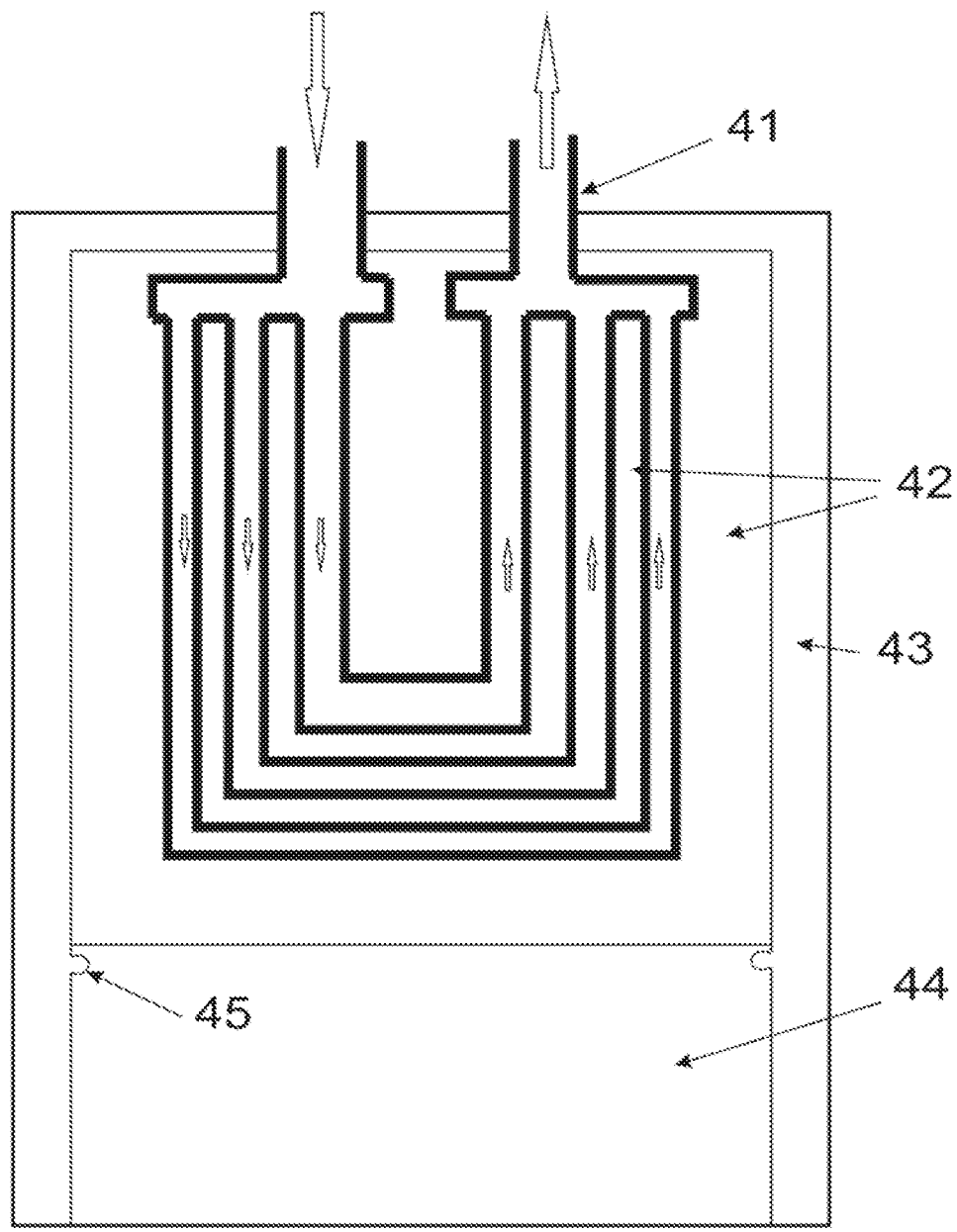

FIG. 16 shows a heat storage unit using a solid cylindrical core of iron as the heat storage medium.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary.

Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Figure 1:
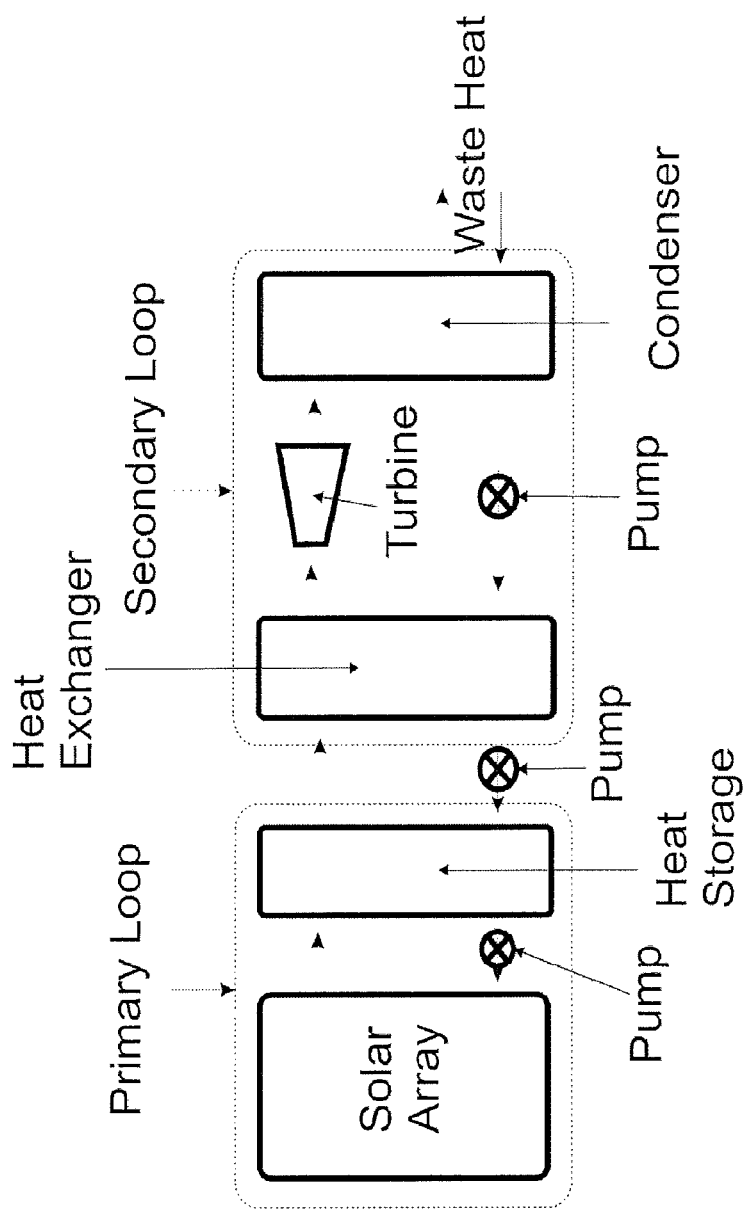
FIG. 1 shows the schematic layout of the entire power plant.
Figure 2:
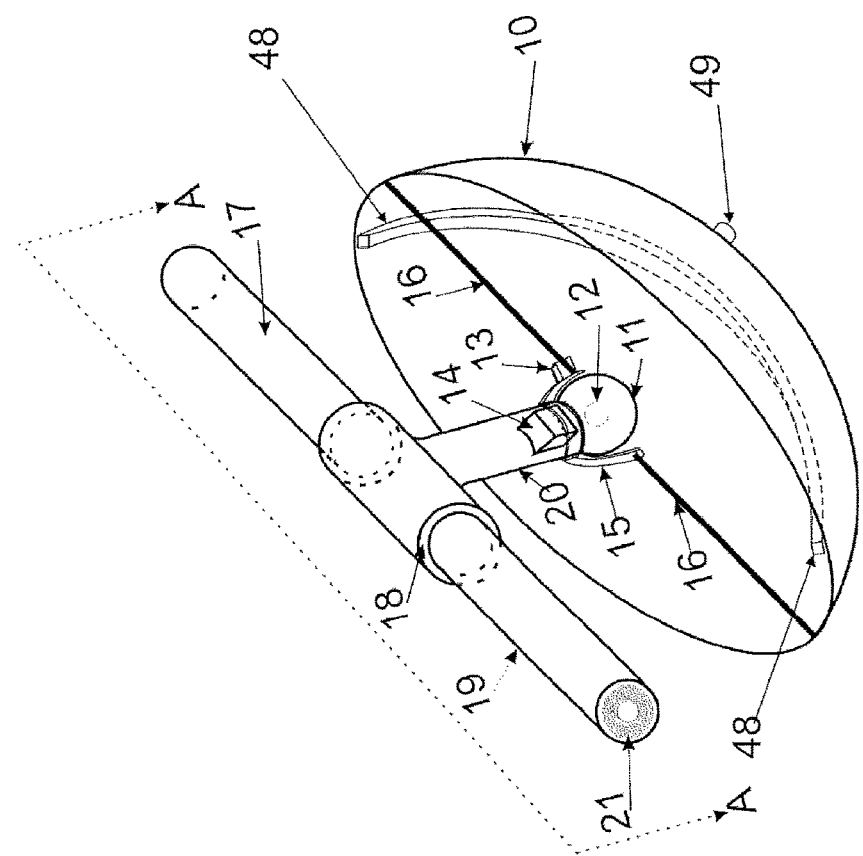
FIG. 2 shows the structure of a single dish along with the outer and inner pipe setup along with multi layer insulation and automated dry cleaning arm. The concentrated light receiver along with the 2 drive motors is also shown.

The system of the present invention comprises a parabolic dish as shown in FIG. 2 (the four corners 22 have not been shown in this figure so that other aspects are more visible) to obtain very high sunlight concentration ratio which will allow for operation at high temperatures. The reason for this is that the higher the operating temperature, the higher will be the conversion efficiency from heat to electricity. The size of the dish will be kept relatively small, on the order of 1 to 2 meters in diameter so that it can easily be manufactured it from a single thin sheet of metal and a thin sheet of PVC, Acrylic, or any other suitable material using processes like die punching or vacuum forming etc. After the metal and non flammable smooth surface polymer sheets have been formed into the desired parabolic shape, they will be bonded together. The front side of this composite material dish will then be coated with aluminium or silver and protected with a thin layer of Silicon Dioxide. This will allow for a very accurate high rate of production at low cost, which is essential for any solar plant. If solar energy is to be used on any significant scale then several billion reflectors would be required each year. Naturally, it is essential that a simple process be used to produce on that scale. It is to be noted that in the present embodiment the invention has been described having parabolic dish of dimension as stated herein above. However, such dimensions may vary in practice and in accordance with the need/capacity of the plant. Such variation would still be considered in the spirits of the present invention.

The metal plastic composite sheet 10 used in the reflector dish has several advantages over glass based reflectors. It will be much cheaper to manufacture and can be made on a large scale easily, will not break, and will be much lighter in weight. Another advantage of using a metal composite sheet in a parabolic dish shape in a relatively small size is that a very thin sheet of metal will have the strength to maintain its shape without any structural support. The metal sheet provides the strength and the thin non flammable flexible sheet will provide the smooth reflective surface with a coating of aluminium or silver on one face. This results in a very light weight dish which is essential for my design since, as seen in FIG. 2, the drive motors 13 & 14 are at a significant mechanical disadvantage.

Front coated mirrors with a protective coating of a very thin layer of silicon dioxide will be the preferred choice (back sided mirrors can also be used if desired). There are several very important reasons for this. A front coated mirror has a much better reflectivity then a back coated mirror since light will not have to pass through a base material twice. The best transparent glass has a transmission capability of about 90% so about 20% loss in efficiency results by using a back coated glass mirror. Another important reason is due to the ability of dust to stick to various materials. It has been noticed by the present inventor that a front sided mirror with a silicon dioxide protective film is a surface on which dust has great difficulty in attaching itself to. Most of the dust simply falls off the surface when held in a vertical position and the remaining amount can easily be removed with low pressure compressed air or a microfiber cloth or duster with no scratches on the base material. Even after depositing dust on the reflector several hundred times and cleaning it with a microfiber cloth, there was no significant scratching of the reflective surface. All back sided mirrors whether of glass, acrylic, plastics, or PVC showed at least a 10 to 100 fold greater affinity for dust and the dust was much harder to remove. This may be due to static charges or other reasons, resulting in a clear preference for front sided mirrors from the dust point of view.

Therefore, a small rotating arm 48 fixed at the centre of each dish with a microfiber cloth fixed between the bottom face of the arm and the reflective surface or pressurised air provision would be sufficient to clean the reflective surfaces automatically. The rotating arm 48 could be activated by a drive motor 49 whenever it is determined that the reflective surface needed cleaning. The use of this dry cleaning automated system is essential in an environment which has high dust and no water.

In dry environments it is easy to remove dust on a front sided mirror with a microfiber cloth, but when mixed with rain or dew, the dust attaches to the surface with much greater adhesion. The water will also leave water marks on the surface and this will reduce the reflectivity of the surface. There will be times when the dishes 10 may require a wet cleaning process such as after rain. At such times, the dishes 10 to be cleaned will be removed and replaced with another and sent to an onsite wet cleaning facility. This facility will recycle all the water so that there is no wastage of water.

This is one important reason why it has been chosen to air cool the waste heat from the condenser (the other is obviously the lack of water in deserts). If most of the energy is removed from the solar array area, a situation may arise where the air temperature will drop drastically. This would cause significant water condensation in the form of dew, especially at night and early morning, resulting in a need to very frequently wet clean the reflectors 10. The labour and material costs would be so high as to render the plant economically unviable. The finned vertical supports 23 which support the solar array and pipes 19 will dissipate all the waste heat in this region and ensure that the air temperature does not drop to the point where dew formation is possible. These supports 23 are hollow and hot water will pumped into them through pipe 51 (see FIG. 3) allowing for dissipation of waste heat and keeping the air temperature around the dishes above the condensation point of water. The pipe supports 23 and pipes 51 will be connected in series so that the hot water flows from one support 23 to another and once the temperature has dropped enough, is returned to the plant heat exchanger to be heated up again.

Figure 6:
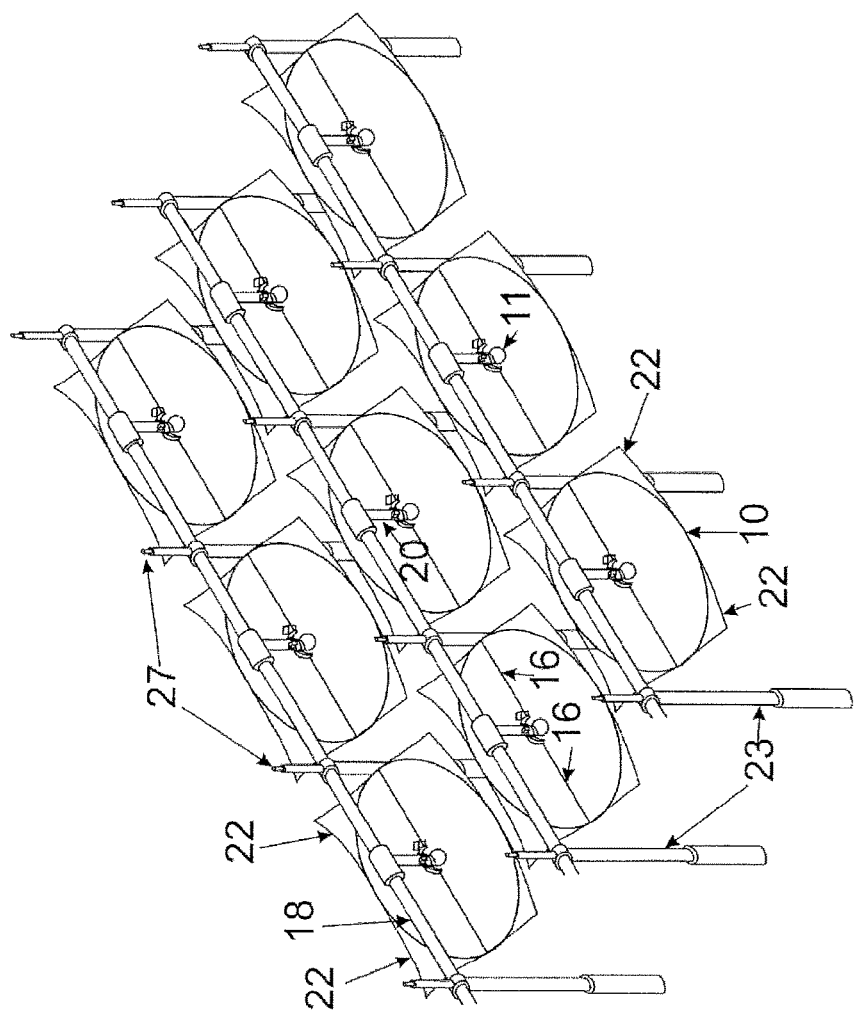
FIG. 6 is an aerial view of a few dishes with all support structures except the filters and robotic arm (and protective housing and the cleaning and maintenance rails in the case of plants located in rainy areas).

One major disadvantage of existing designs is that a huge amount of land is wasted since in most cases only about 25% or less of the actual land occupied by the plant is covered with reflectors 10. This may not be a problem today, but if solar energy was cost effective and done on a large global scale, then obvious problems will exist, such as land cost and availability etc. That is why the system of the present invention has been made so that the dishes 10 are almost touching each other (see FIG. 6) when the sun is directly perpendicular to the Earth. In addition, the parabolic dishes will be of a square shape and not circular as shown if FIG. 6 so that almost 100% of the sunlight is collected. The obvious advantage of this is that about 25% extra energy is collected for virtually no extra initial investment. The only cost is that of adding four flexible 'ears' 22 to the circular parabola so that it covers a square area. If desired, the plant can also be used without adding these four 'ears' 22 to the circular dish, the only result being a lower efficiency. This may be necessary in certain cases where the temperature of the region may drop drastically due to the removal of too much sunlight from that area.

Figure 3:
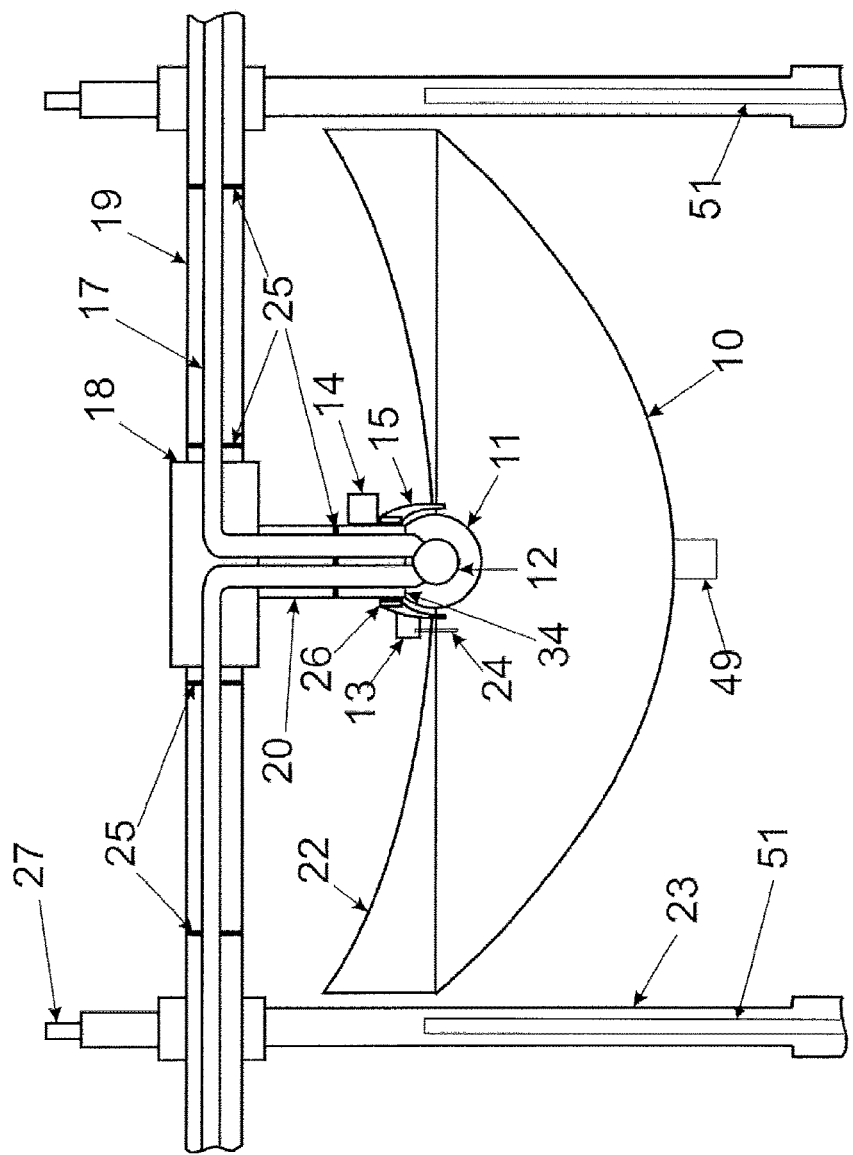
FIG. 3 is a schematic of the internal layout of the pipe as would be seen if FIG. 2 was cut into two through the centre along section AA shown in FIG. 2.

Each dish will have two motors 13 & 14 that will independently control the X and Y axis location as shown in FIG. 3. Motor 13 will use gear 24 to rotate support arm 16 whereas motor 14 will rotate the cylindrical collar 26. The very thin sheet of metal used, results in a very cheap and light weight dish. Because of the very light weight of the dishes, very small motors will be sufficient to move the dish which will allow for the use of cheap motors even though the motors will be at a mechanical disadvantage. Each dish 10 will be assigned a unique X and Y coordinate with the first dish having the coordinate of 1,1 and the coordinate of all the other dishes will be determined by their location on the X and Y grid. Each dish 10 will have a control circuit with a microprocessor which will have that dishes unique location embedded in its memory. The job of the circuit will be to control the motors 13 & 14 so that the dish 10 will track the sun and ensure that the sun light is focused on to the receiver 12 at all times. The position of all the dishes at any point of time will be controlled by a central master computer which will calculate the position of the sun mathematically and will also cross check its mathematical calculations with a sun tracking sensor at all times. A further manual control can also be done if required. Whenever the central computer requires any dish to move, it will first send the coordinates of the dish that it wants to move followed by the amount it wants to move that dish. The dish will only move if the X,Y coordinate sent by the computer match with those stored in the memory of the microprocessor of that particular dish.

Each dish will be connected to the drive motors by support arms 16, which will be the only support the dish 10 will receive. The lowest point of any dish will be about two meters raised from the ground (see FIG. 4). Since there will be no spaces between any dishes, this space will be the only way to provide repair and maintenance for the entire array of reflector dishes 10, motorised drives 13&14 and pipes (tubular structural members) 17,19&20 of the primary loop. The function of pipe 20 (another tubular structural member) which is substantially in perpendicular relationship with the tubular structural member is to provide free movement to the dishes during winter times when the sun will be at an angle. The length of pipe 20 will get longer the further away from the equator that the plant is located. Since the plant sizes will be very large, possibly many kilometers in either direction, specially equipped battery powered motorized vehicles will use this space for all servicing requirements. Strategically located cameras, temperature sensors, heat sensors, vibration sensors along with other sensors and feedback from the individual circuits of each dish will help locate the source of any problems for immediate attention.

Figure 5:
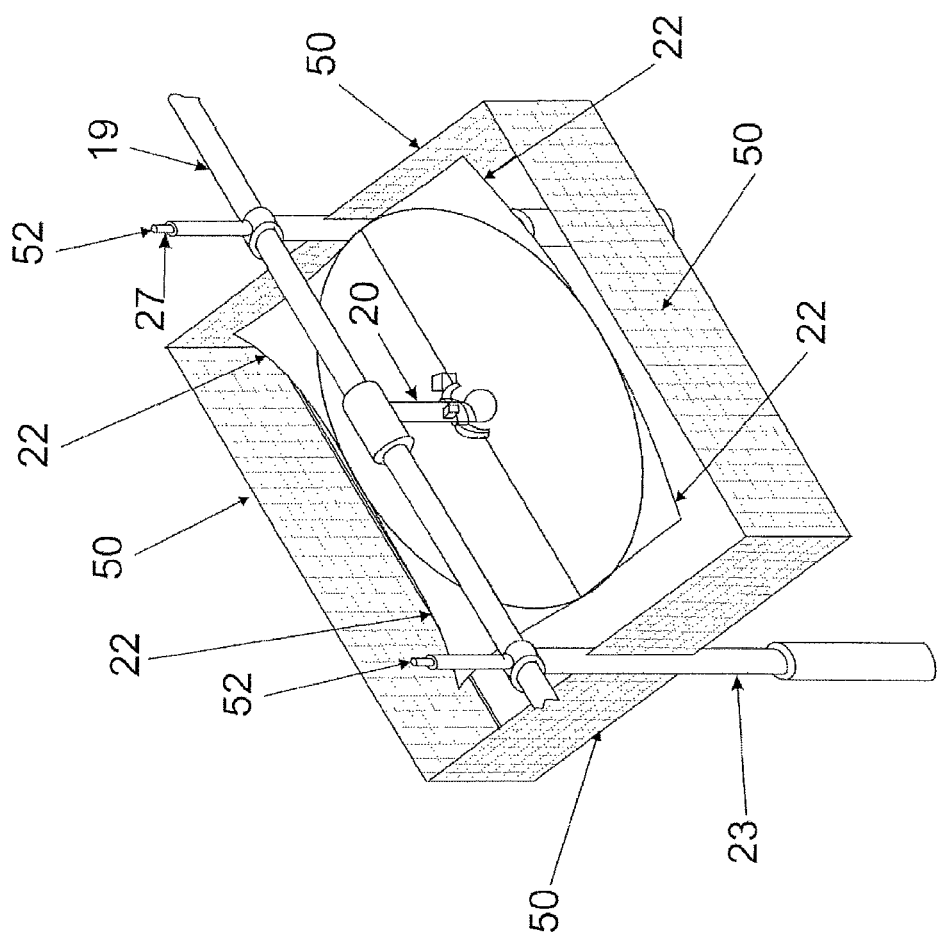
FIG. 5 shows the position of the vertically placed filters, designed to catch and remove dust and provide protection from wind along with the location of the air ionizers needles.

With so many moving dishes, there will always be the probability that a few dishes will either not be moving or will be in the wrong position for whatever reason. It is essential that these malfunctioning dishes do not obstruct or hinder the free movement of the properly functioning dishes in anyway and with the dishes almost touching each other when the sun is directly overhead, there could be a cascading effect. This could even render the plant useless for most of the time. Therefore, it is essential that malfunctioning dishes do not affect any other dish whatsoever. In order to ensure this, the distance from the focal point of the dish to the centre of the dish should be equal to or less then D/4 where D is the diameter of the dish. The four ears 22 of the dish which make the dish square in shape (see FIG. 5) will be flexible and will simply bend if they come in contact with anything.

Figure 4:
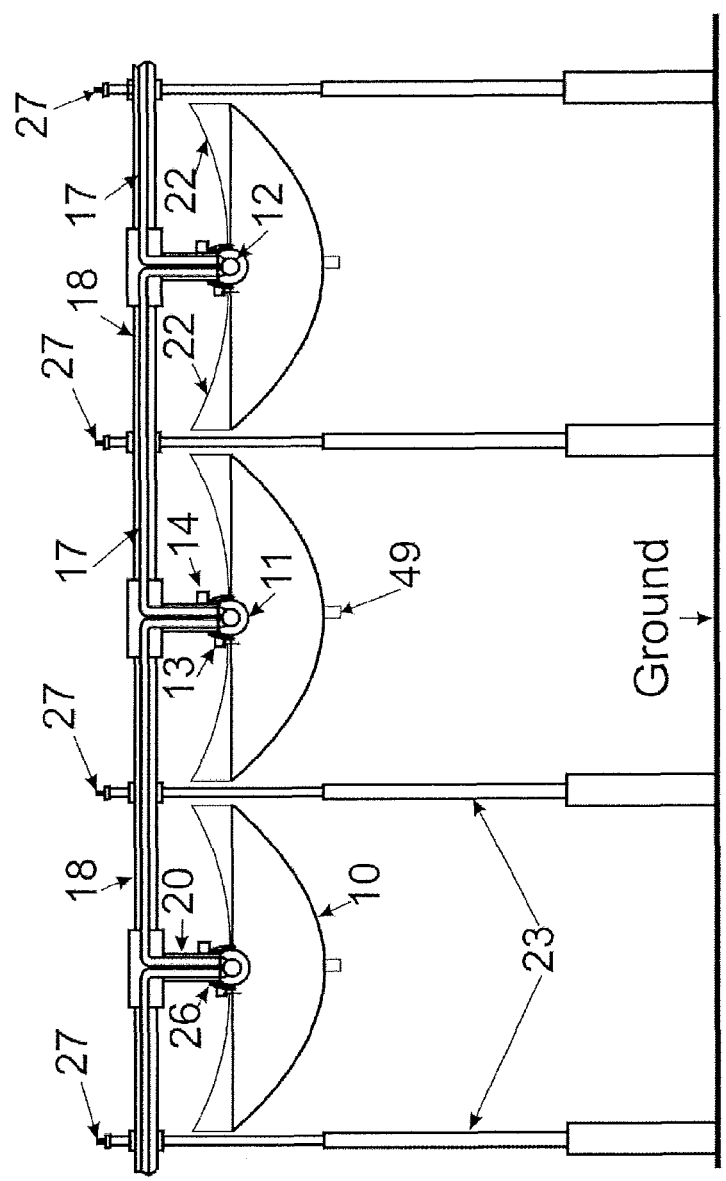
FIG. 4 shows how the dishes would be connected together along with support structures.

As shown if FIG. 2 and the cross sectional AA view in FIGS. 3 & 4, the dishes will rotate around a fixed focal point 12 which never moves. One of the main advantages of keeping a fixed focal point 12 is that no expensive and failure prone high temperature moveable joints are required. All piping remains in a fixed location and the dishes 10 are the only moving parts. All the sunlight is concentrated onto a small spherical blackbody receiver 12 after passing through a glass or plastic fishbowl 11. The receiver 12 is surrounded by a vacuum in order to prevent heat loss due to conduction and convection. This small spherical receiver 12 is the only portion of pipe carrying the primary loop coolant which is not shielded by multi layer insulation 21 and is, therefore, the only place where any significant energy is lost due to re-radiation. However, the small surface area of the receiver 12 ensures that the amount of energy lost to re-radiation is kept to a minimal. Since the amount of radiation is proportional to the fourth power of temperature, even a small area can radiate significant amounts of energy if the temperature is high enough. In fact it is this energy loss due to radiation which severely limits the maximum operating temperature that can be achieved in a lot of the solar power plant designs (e.g. solar trough technology, power tower etc.) where the re-radiation area is large. The receiver 12 is essentially a hollow shell sphere with a coating that absorbs all wavelengths of light very efficiently, in effect a blackbody. It is connected by two pipes 17, an inlet and an outlet, through which an inert gas will flow at high pressure and carry away the heat collected by the receiver 12.

Figure 11:
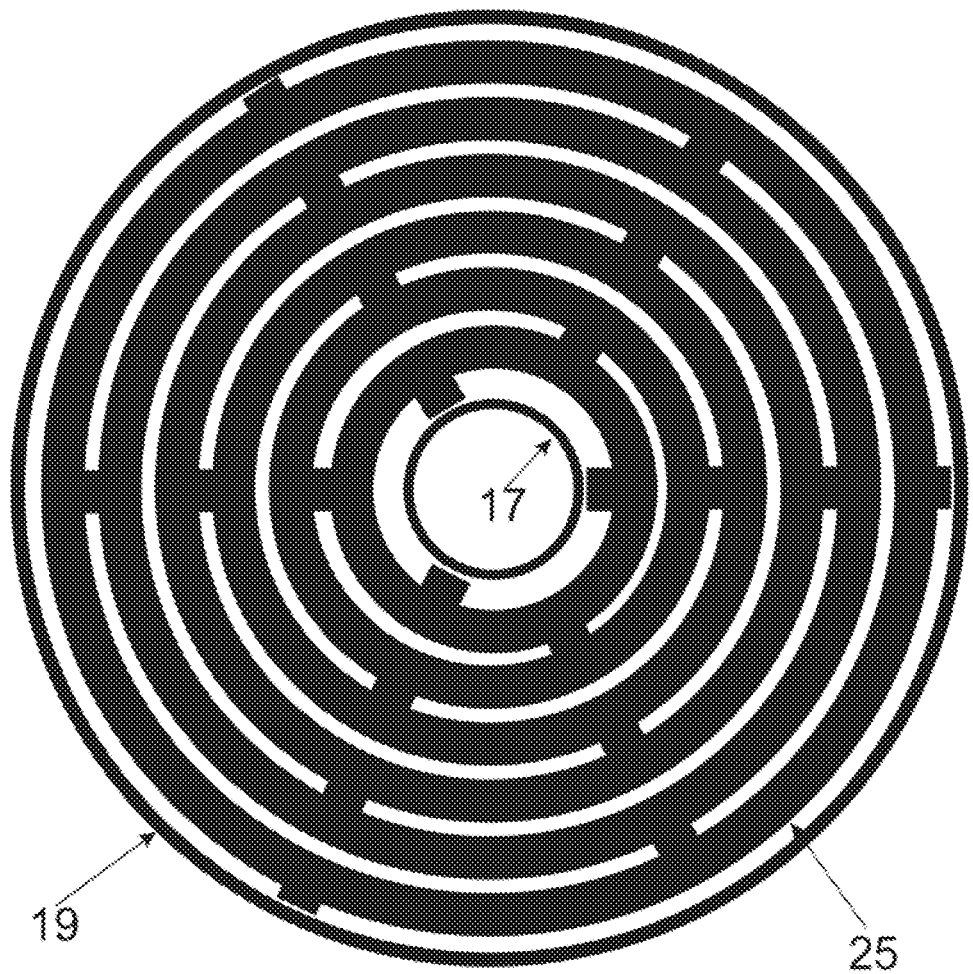
FIG. 11 is one of the supports used to ensure the inner pipe stays in its place.
Figure 12:
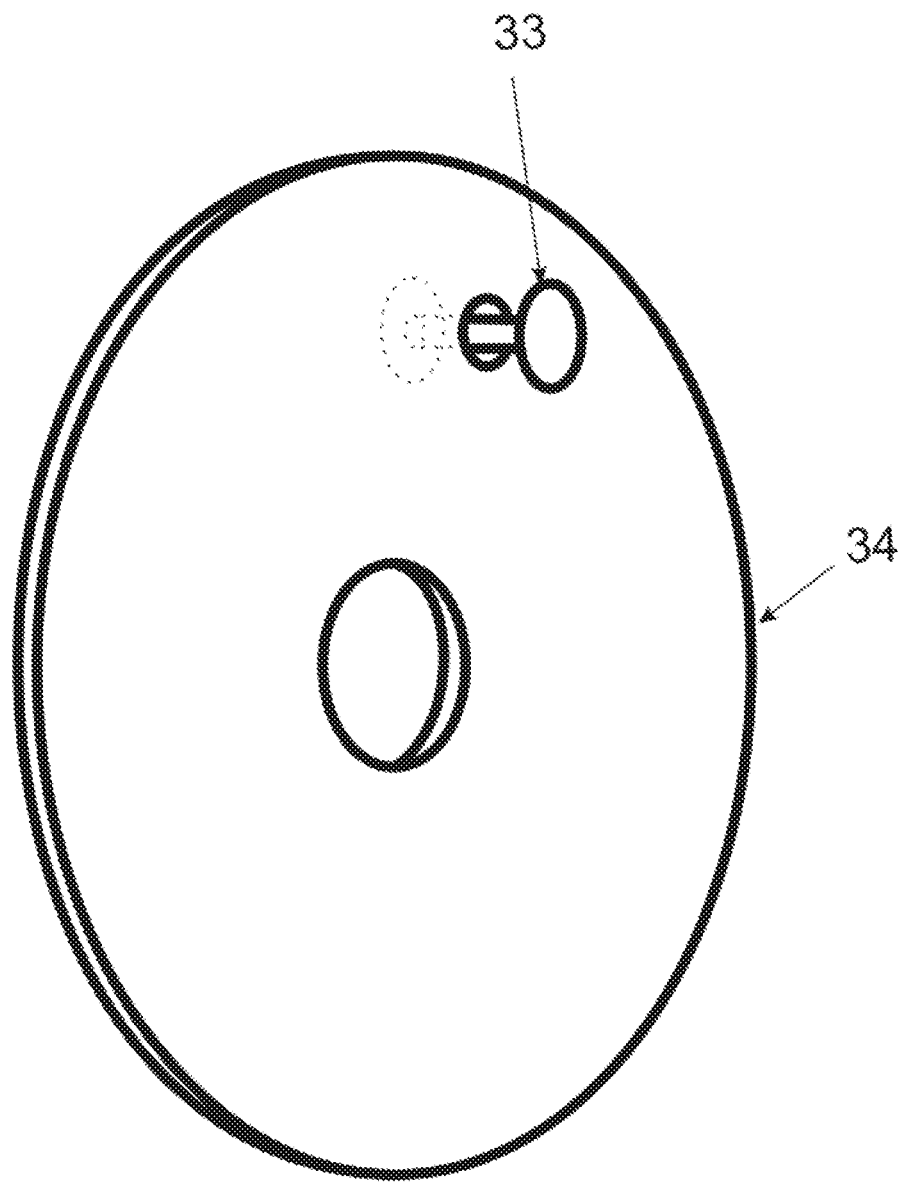
FIG. 12 is the support used at the place where the glass or plastic fish bowl connects to the outside pipe. It has a bi directional cut-out valve to ensure vacuum integrity in case the glass breaks.

The inner pipes 17 are connected in series (see FIG. 4) so the heated gas of one dish will be the inlet gas of the next dish receiver until the gas has reached the desired temperature at which point the hot gas is sent to the heat storage unit and heat exchangers. After losing energy and temperature, this cooler gas is then sent back into the primary loop to be reheated. The pipe that carries the primary loop coolant gas will be a single continuous pipe with all joints welded so that there is less scope for failure. This is very important, because due to the design, it will be very difficult to access this pipe if there is any type of failure and so it would be preferred that this pipe should operate over the entire life of the plant without requiring any maintenance. This inner pipe 17 will be surrounded by a secondary pipe 19 and the space between the two pipes will be kept a vacuum to reduce heat loss. The outside surface of the inner stainless steel pipe 17 will be highly polished to have a mirror like surface to reduce radiation and will then be shielded with a very thin highly polished mirror finish stainless steel multi layer shield 21 (see FIGS. 2 & 10). Gold plating could be used on the multi layer shielding 21 to improve the effectiveness of the shield, but the very high cost of gold makes it far too expensive. The same effectiveness could be achieved using by simply using more layers of highly polished steel. The vacuum between the inner pipes 17 and outer pipes 19, and multi layer shielding 21, will ensure that the heat loss due to radiation from all sections of the primary loop except the small spherical receiver 12 will be kept at almost zero The bends in the inner pipe 17 (see FIG. 3) will allow for thermal expansion in the pipes which can be quite significant between noon (time of maximum solar radiation) and night time when the pipes 17 could be at ambient air temperature. So we will have to assume that the pipes will go through a 700-1000° Kelvin temperature cycle everyday and free movement and expansion allowance is essential for the inner pipes 17. With this large temperature range, thermal expansion will be around 2% for stainless steel and this design will easily accommodate that movement. The supports for the inner pipe 17 will be mainly provided by the multi layer heat shield 21 (see FIG. 10) and also supplemented with a combination of thin wires connecting the inner and outer pipes, support discs 25 (see FIG. 3) of the type shown if FIG. 11 and very thin discs 34 with bi directional cut-out valves 33 (see FIG. 12) of low heat conducting metals like Titanium etc. The exact combination and location of each type of support for optimum performance will be determined experimentally. Wires will naturally provide the lowest form of heat loss due to the low cross sectional area but cannot on their own provide complete stability to the inner pipe 17 due to vibrations caused by high pressure gas flow inside. The perforated discs 25 provide greater support and yet restrict heat flow due to the small cross section area and long distance that heat will have to flow. The third type of support will be a very thin sheet of Titanium which will basically be just a thin sheet 34 (see FIG. 12) with a small cut-off valve 33 built in that connects the outer and inner pipes. These will only be placed at certain locations and will, in addition to being a support, act to seal off whichever section that has a vacuum seal failure so that other sections are not affected by a localised problem. For example, they would be placed at the place where the fish bowl glass 11 connects to the outer pipe 20 (FIG. 3). Therefore, if the fish bowl 11 was to break for whatever reason, the vacuum seal in that entire pipe section would continue to operate without any problem. A considerable amount of the support would also be provided by the unique heat shield 21 design which surrounds the entire inner pipe 17. The combination of all these types of supports will provide a heat loss of less then 10 W per meter length of pipe 17. Assuming an incoming radiation of 1000 W/m², this loss is well within requirements. Another maximum loss of 5 W per meter length of pipe would be incurred if ten layer multilayer insulation was used. This loss is only about 1-2% of the incoming radiation and is negligible.

Figure 10:
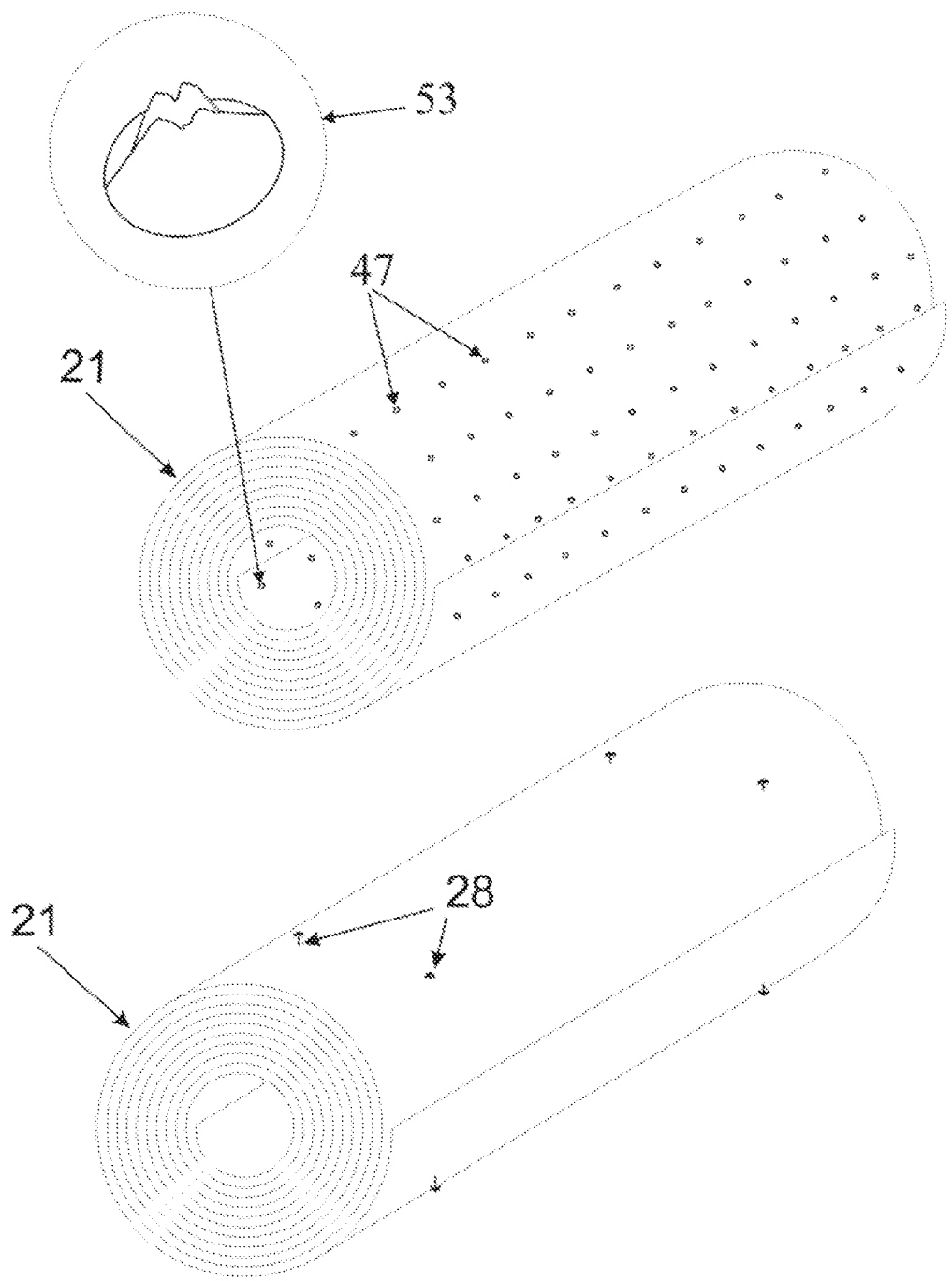
FIG. 10 shows a section of the heat shield used in vacuum insulation of the hot inner pipes.

The multi layer insulation (MLI) 21 is shown in FIG. 10. It consists of a very thin sheet (less then 0.1 mm thickness) of low thermal conductivity material such as stainless steel that has a high melting point and will be highly polished to a mirror finish on both sides. MLI used in satellites consists of many layers of thin sheets coated with gold and separated by a low conductivity material woven in the shape of a bridal veil. This design will have problems at the 1000° Kelvin temperature range as a suitable effective bridal veil will be difficult to make, and it would not be so easily manufactured for large scale production or have the structural strength to support the inner pipe 17, will cost more as gold plating on both sides would make it prohibitively expensive, and will be more difficult to install in the shape required.

The multi-layer insulation as illustrated in FIG. 10 can further be constructed replacing support pins with plural small dimple like protrusions 47 which will prevent sagging and possible contact between different layers due to creep. The shield 21 will be expected to operate in very high temperatures, heated and cooled on a daily basis, and expected to last the entire life of the plant without any maintenance and therefore this modification is seen as necessary. It is simply just a long very thin sheet of metal (approximately 0.1 mm or thinner) such as stainless steel or any other appropriate metal with poor thermal conductivity polished on both sides to a mirror finish. After polishing, the sheet would be passed through a roller equipped with a large number of small diameter sharp pins spaced about 1 cm apart which would create depressions on the sheet. The dimples 47 could be further apart than 1 cm to reduce contact area, but since the piping system needs to be designed to last at least 20 to 30 years as maintenance would be extremely difficult and expensive, we will probably use a spacing of about 1 cm. In addition there is no existing data on how metal creep would progress in such a design, so it is better to be a little extra cautious since we do not want a situation that the sheets touch each other due to creep caused by the very high temperatures. However, because of the very small contact area of the dimples 47, the amount of heat loss due to conduction will be only a few watts per meter length. The sharp pins will create a small dimple (0.25-0.5 mm in depth) on the sheet which will prevent the different layers of the sheet from touching each other when the sheet is rolled up into a coil. If the dimple 47 is less then say 0.25 mm in depth, the sheet does not tear and the dimple has a smooth rounded bottom. If the dimple is made slightly deeper to the point where the sheet just tears at the bottom of the dimple, we get a surface that has very sharp and rugged edges 53 (see FIG. 10) that creates an extremely small contact area when the sheet is rolled up into a coil. Either type of dimple can be used, but in order to reduce thermal conduction to a minimum it would be desired to have the smallest contact area between two layers to minimize conduction, therefore, the dimple 47 which just tears at the tip 53 would be preferred.

Ideally each ring of the MLI 21 should have no contact with the next ring but my design will achieve almost the same amount of insulating properties as long as the sheet is very thin. If the sheet is less then 0.1 mm in thickness, heat loss due to conduction can be kept to just a couple of watts per meter length of inner pipe 17. It is important, however, that no two layers come into physical contact as that would reduce the insulating properties of the shield. The distance of separation between two layers is not important only that they should not come into physical contact. A separation distance of a few microns would have the same insulating effect as a separation of a meter. However, for practical purposes, we will maintain a separation distance of about 0.5 mm or so in order to take into account the fact that the sheets may sag or bend over the life of the plant. Having to repair of replace any shield would be a cumbersome and expensive procedure which would be highly undesirable.

A second way to make the heat shield 21 (see FIG. 10) would be to take a polished sheet, create the dimples 47, and then cut the sheets into predetermined sizes so that cylinders of increasing diameters can be made by welding. These cylinders would then be placed inside each other until the desired number of layers of shielding are formed. The dimples 47 will prevent the individual layers of cylinders from touching each other with any significant contact area. This method of shielding has slightly better insulation properties since we reduce the thermal conduction, but has a slightly higher production cost and lower production rate due to the welding requirements. The welding process will also slightly reduce the reflectivity at the welding joints so the net advantage of this process may be negligible.

Whichever technique is deployed, this form of heat shield 21 has many advantages which are essential to the success of this design. The extremely simple design and use of appropriate metals allows for extremely fast rate of production at a very reasonable cost. In a few millimeters of space we can achieve the same insulating properties as several meters of conventional high temperature thermal insulators at a very small fraction of the cost. Because of the curved cylindrical shape and small contact prevention depressions 47, the heat shield of the present invention has considerable mechanical strength even at very high temperatures and provides considerable support to the inner pipe 17 while isolating it from the outer pipe 19. In sections where the inner pipe 17 is straight, a single long cylinder of shield 21 is sufficient. Where the inner pipe 17 is curved, the heat shield 21 will approximate the curve by using small sections cut at the appropriate angle at the ends. These sections will be independent and not welded to each other thereby allowing inner pipe 17 the space to expand or contract with temperature variations. This design of shield provides excellent support to the inner pipe 17 to prevent it from bending or sagging which has little other support (and necessarily so) while at the same time providing no resistance to the thermal expansion or contraction of the inner pipe 17. Since the shield is always in a vacuum, there is no reason why it would not last even a hundred years in spite of the very hostile operating conditions.

The outer pipes 19 will provide the structural support and strength for the entire primary loop in addition to other important functions. The inner pipes are flimsy without the rigid support provided by the outer pipes and the outer pipes are also necessary to provide the vacuum shield around the hot inner pipes so as to keep heat losses to a minimal. If it was not for the excellent insulating properties of a vacuum in conjunction with MLI shielding 21, the heat loss would have been so high as to make the project far less viable. Just by increasing the number of layers of MLI shielding 21, the heat loss can be reduced to any amount desirable and without taking much space.

The outer pipes 19&20 also provide the entire support to the dishes which are suspended in air with only support from the outer pipes. All the motors, electronics, and drive gears are also fixed on the outer pipe 20. Two vertical support pipes 23 fixed in the ground on either side of the dishes 10 are the only support provided to the outer pipe 19. All joints in the outer pipes are also welded to provide long trouble free life and vacuum integrity between the inner and outer pipes. The outer pipes will operate in a temperature range of only about 50° Kelvin or less and so the thermal expansion will be less then 1 mm per meter length for pipe 19. However, provision for expansion and contraction is still needed and is provided by the flexible joint 18 as shown in FIGS. 2&3. Since the outer pipes will not operate under extreme conditions, cheap mild steel can be used instead of high quality and expensive low carbon stainless steel.

The above design is very susceptible to strong winds due to the great mechanical disadvantage at the motor junction. One undesirable solution to this would be to use heavy duty parts and motors which could add considerably to cost. In addition, due to the very dusty and windy nature of all deserts, there would be significant dust deposited of all reflective surfaces. This would result in a drop in efficiency if frequent cleaning was not conducted. However, with parabolic surfaces, cleaning is not always easy and would also consume a lot of water and would require a lot of manpower resulting in considerable cost. In addition, the frequent dust and cleaning would considerably shorten the life of the reflective surface which is very delicate adding to more cost.

This problem is taken care of by using a combination of air ionizers 52 placed on top of support column 23 and dust filters 50 (see FIG. 5) placed in substantial vertical positions on all four sides of the dishes 10. The air ionizers 52 will charge up the dust particles so that they will stick to any grounded or oppositely charged surface. The dish 10 will also maintain a mild charge of the same polarity as the dust, so that dust is repelled from the reflective surface. Although air ionizers have been developed for indoor use, there is no reason that this technology cannot be used outdoors also. The tip of the ion discharge pin 52 will be placed on the top of the support pillars 23 and this even spacing will allow for a reasonably uniform charge distribution and complete coverage of the solar array. The power required by air ionizers is a very small fraction of the final power output from each dish so their use will not affect plant viability at all.

The vertically placed dust filters 50 have two functions. The first is obviously to catch dust in the air and stick to it. The second is to stop wind from exerting any force on the solar collecting dish 10. The filters 50 are placed vertically on all four sides of all dishes in the solar array (see FIG. 5). These filters do not obstruct the incoming solar radiation in any way due to their positioning, but are very effective at catching most dust particles and reducing wind speed around the dishes to almost zero even with very high atmospheric wind conditions. This allows for continuous and maximum power production in all conditions. This will allow for many continuous weeks or months of operation without having to wet clean the dishes 10, which in this design is a labour intensive and expensive process. If the dishes 10 had to be cleaned on a daily basis, the labour costs would greatly increase and the plant would not be feasible at the very low and unsubsidized cost of electricity.

The filters 50 will be low cost and of a very simple design and somewhat similar to those found in air conditioners or any other similar type. The objective is to have a filter 50 that has very little mass or manufacturing cost and yet be able to catch dust particles effectively and should be washable. A mild positive charge will be maintained on the filters 50 so that the dust particles which have been negatively charged with the air ionizers 52 will be strongly attracted to the filters 50 and will attach with them. Whenever the filters 50 have collected sufficient dust, they would be removed for a wet cleaning process similar to that which the dishes 10 would undergo. Depending on the conditions, these filters 50 should be able to go for weeks without cleaning.

The third defence against dirt will be a small very light weight robotic arm 48 (see FIG. 2) that is in the same profile shape as the dish reflective surface 10 with a microfiber cloth between it and the reflective surface. A small motor 49 mounted below the centre of the dish 10 would rotate this arm once a day or as required to remove dust on a regular basis. It was tested by allowing dust to settle on a front sided mirror with a silicon dioxide protection a few microns thick. The dust was then removed by using a microfiber cloth with very little pressure applied (pressing the cloth with more force tends to scratch the surface once some dust has accumulated in the cloth) and even after 100 cleaning cycles using the same cloth without washing, there was no significant scratching of the surface. On back sided mirrors the dirt sticks with much greater force regardless if the base material is glass, acrylic of any other polymer resulting in some dust remaining on the surface. Use of greater pressure on the microfiber cloth did improve the cleaning, but after a few cleaning cycles as the dust accumulates in the cloth, it begins to start scratching the surface significantly. Whenever the dishes are sent for wet cleaning, the microfiber cloth on the robotic arm 48 will also be sent for washing.

The robotic arm 48 can also be fitted to a pressurised air hose and remove dust with air pressure as it rotates. When using pressurised air it is necessary that the pressurised air is free of any moisture otherwise the water droplets would help the dust bind onto the surface that only wet cleaning will remove them. Whenever cleaning is required a small solenoid valve would open allowing pressurised air to flow into the robotic cleaning arm, which would then exit the arm through small holes along the entire length of the arm. A small motor 49 would rotate the arm 48 so that the entire dish surface could be cleaned.

Rain is one aspect that is going to provide some minor problem since the dust will lose its charge and will bond with the reflective surface. In addition the rain will also leave water stains on the reflective surface which can only properly be removed by wet cleaning. Fortunately, most deserts have rain only a few days per year so this should not be a major problem but more of a minor nuisance.

Figure 8:
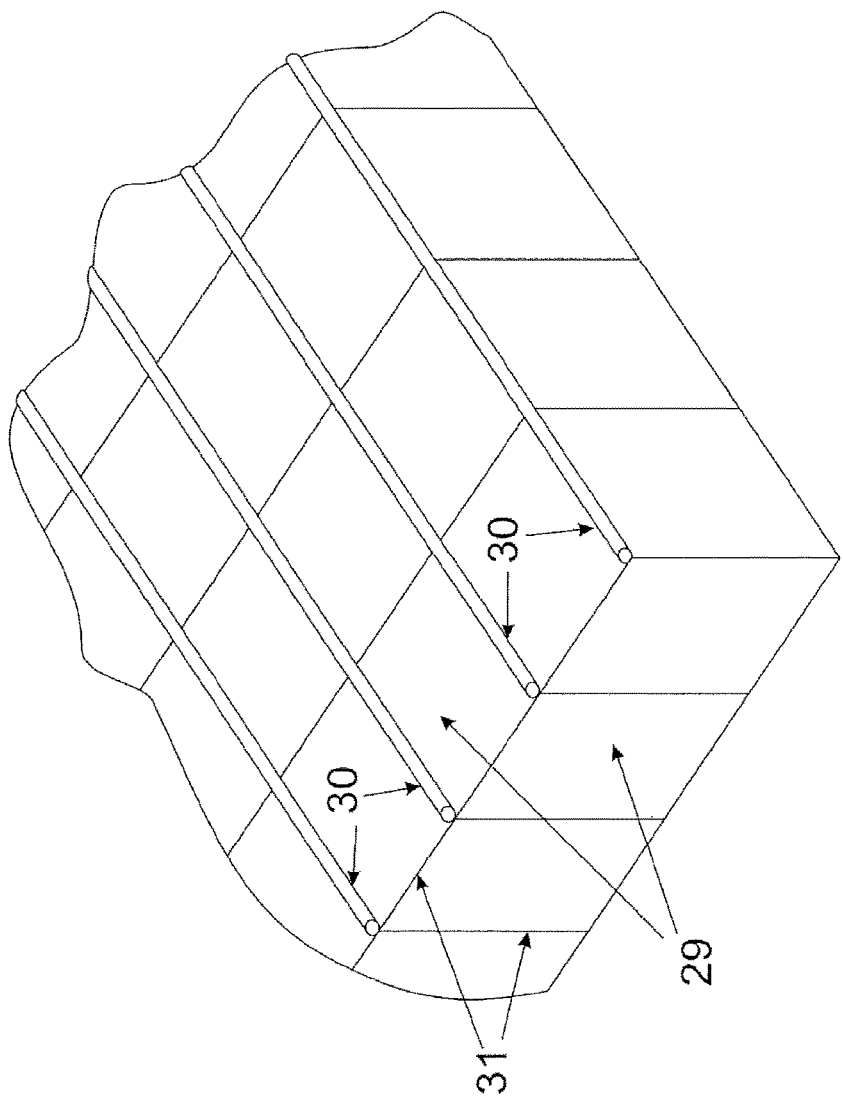
FIG. 8 is an aerial view from a corner of the plant showing the solar collection array with protective housing along with service rails. Although the protective housing is transparent and the inside mechanism and dishes would be clearly visible, they have intentionally not been shown to give a better perspective of how the outer protective housing would look in shape and appearance.
Figure 9:
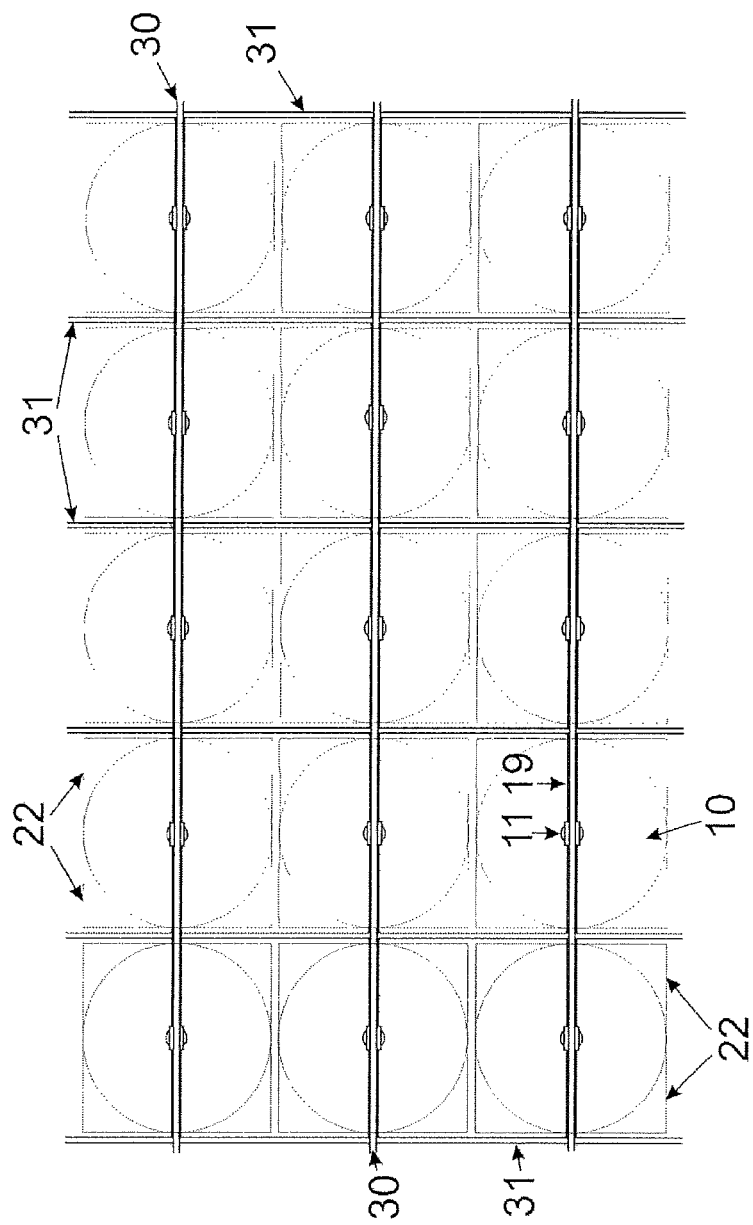
FIG. 9 shows how the plant would look if someone was to see a small section from above at a perpendicular angle.

Another solution that can be used in cases where the environment is simply too dusty or rain is very frequent or hurricane force winds are common is to simply eliminate the dust and wind altogether by enclosing the entire primary loop of the plant in what would effectively be a giant glass house 29 as shown in FIG. 8. This protective housing will end up in a significant reduction in plant efficiency but also has some important advantages in rain prone environments. All the walls of the 'glass' house are fixed and do not move in any direction. Only instead of glass, the preferred material would a non flammable plastic polymer or Teflon. Glass would be more expensive, much thicker and heavier, more prone to catastrophic failure and provide less transmission of light then other materials. Naturally the use of a transparent enclosure would result in a slight drop in efficiency due to the absorption and reflection of the housing material. The amount of absorption can be quite small for certain materials and so can be ignored. However, the amount of light reflected would depend on the angle of incidence of the light and the reflection can be unacceptably high when the angle of incidence is high.

The angle of incidence of the light would depend on three things. The first is the time of the day and the second is location on the planet with respect to the equator and the third is the time of the year (winter or summer). There would be no control over the first and third factors, but the problems caused by the second factor can be controlled and eliminated by simply ensuring that the plants are located as close to the equator as possible. Unfortunately, there is not much land mass near the equator, and whatever little there is, is usually a tropical rain forest. Therefore, the next best location for the plants would be at the tropics where there is excessive land mass in the form of deserts and where there is very good sunlight through out the year. Let us assume that a plant was built on the Tropic of Cancer. During summer the sun is directly overhead at noon and we would get excellent plant efficiency. However during winter, due to the Earths tilt on its axis, the best angle of incidence at noon would be about 46° and worse at other times. Generally, for most materials, the amount of light reflected as a function of angle of incidence is under 10% up to an angle of incidence of the incoming light of about 60°, which is perfectly within acceptable values and increases rapidly beyond that. Therefore, any plant would ideally be located at the equator and the plant efficiency would drop as you move further north or south of the equator. In fact, beyond about 30° away from the equator, the efficiency would drop very significantly in winter and the plant would not be effective. This problem could be taken care of by having the protective housing top face tilted towards the sun instead of being horizontal. However, the reducing insolation as one moves further away from the equator reduces the plants cost effectiveness. Fortunately there is more then enough desert available near the tropics. India, Africa, Middle East, U.S.A, South America, China, and Australia are all well located in this aspect. The power for Northern Europe could easily be provided form Africa of the Middle East.

Assuming then that the plant is located reasonably close to the equator, about 50% of the useable sunlight received in any day is within a 3-4 hour space near noon time. At this time the angle of incidence is large and plant efficiency is not affected. In the early morning hours and late evenings when the angle of incidence is very high, there is not much energy available anyway, so the overall loss is not of great concern. In general, the use of an enclosed plant may result in an overall 15-25% drop in the overall efficiency of the plant in summers and 25-40% drop in winters. This would result in a yearly average loss of about 20-30%. These figures would of course depend on the location with respect to the equator and may be higher further away from the equator. This loss could be reduced by about 50% by using anti-reflective coatings on the surface of the protective sheets 29. However, the current costs of anti-reflective coatings is quite high since it is done on a small scale and so it may not be used initially. It is very likely that costs would come down very significantly once used on such a large scale.

However, we must take into account the benefits of gain in efficiency and cost saving of using a protective enclosure 29. First the dishes will always be dust free and so this would result in higher efficiencies then those plants which are not enclosed in a protective housing. It would be difficult to give an accurate value of the advantage gained due to dust free dishes since it would depend on how frequently dishes are cleaned and how dusty a particular environment is amongst other things but a figure of 10% minimum gain in efficiency seems very realistic. Of course, the protective housing would have dust deposited on it also, but it is much easier to clean a flat continuous surface as opposed to a scattered parabolic shape. The protective housing 29 will have rails 30 build on top of it which will be used by unmanned, automated cleaning machines which will continuously pass overhead at high speeds to ensure optimum operating conditions. The supports for the rail will be provided from the same vertical pillar supports 23 at location point 27 which are used to provide support to the outer pipes 19. These machines can also clean during daytime without affecting the plant operation in anyway.

The top surface would not be a totally flat surface. There would be a minor slope build in sections. The lowest point of each section would have a drain pipe to allow for draining excess water that may be left as a result of rain or cleaning. Even though one would not expect much rain in deserts, the huge size of the plants would require some sort of water removal provision.

The protective housing 29 will be completely sealed airtight and the air inside will be a controlled environment with virtually no dust or humidity. Since the dishes 10 do not have to withstand constant pounding from wind, much cheaper and lighter materials can be used for the drive mechanisms 13&14 and support structures. In addition, since the entire air inside the protective housing would be totally dust free and humidity levels would be kept low, the life of all iron and steel products would be greatly enhanced since rust would be eliminated. With no dust, there would be no need to clean the very delicate and difficult to clean reflective surface of the mirror over the entire life of the plant. All these benefits will have a very significant effect on the overall viability and initial and running costs of the plant.

Figure 7:
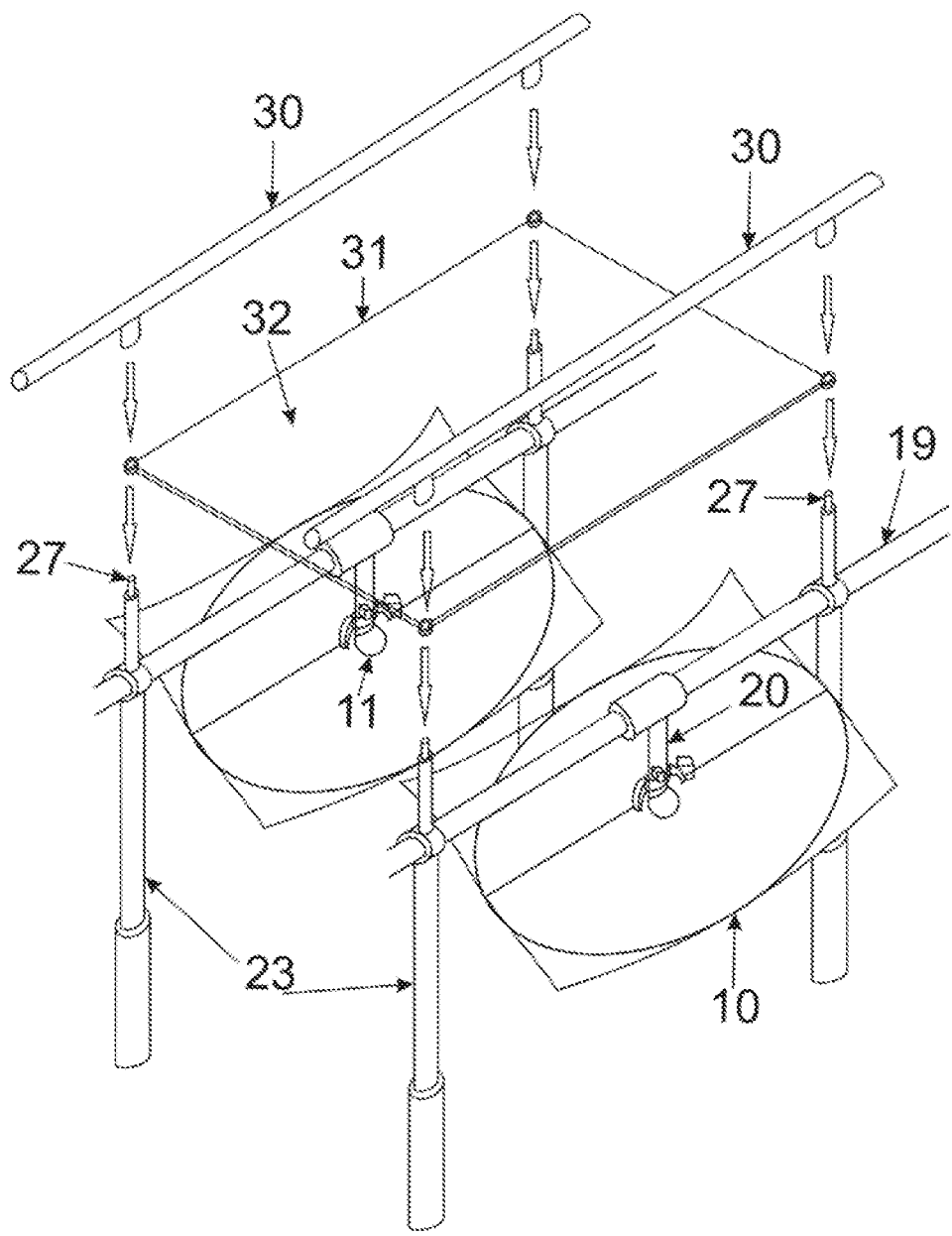
FIG. 7 shows how the protective housing and rails would be mounted.

The initial investment of the protective housing 29 will be very low. All that is needed is a square border 31 (see FIG. 7) onto which the transparent sheets 32 will be bonded to provide air tight support. Each square section of the protective sheet will take its support on its four edges at point 27 of the vertical pillars 23 that support the primary loop pipes 19. The actual protective sheet 32 of the housing will be as thin or thinner than a sheet of paper and so the cost per square meter will be very low. The benefits of the protective housing 29 are far greater than its initial investment. FIG. 8 shows what a small section of the plant with protective housing would look like if viewed from above.

Figure 13:
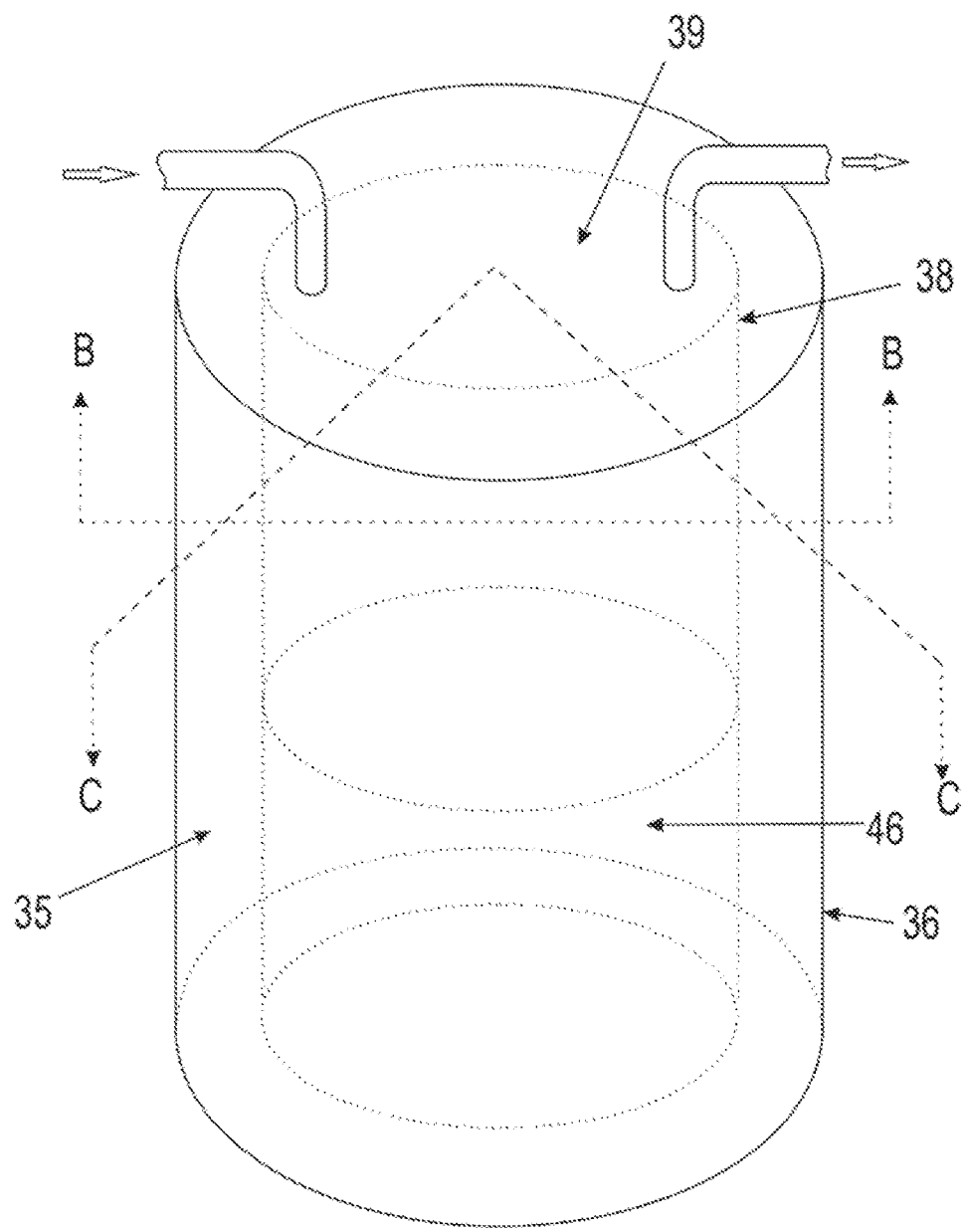
FIG. 13 shows the basic outer view of the heat storage unit.
Figure 14:
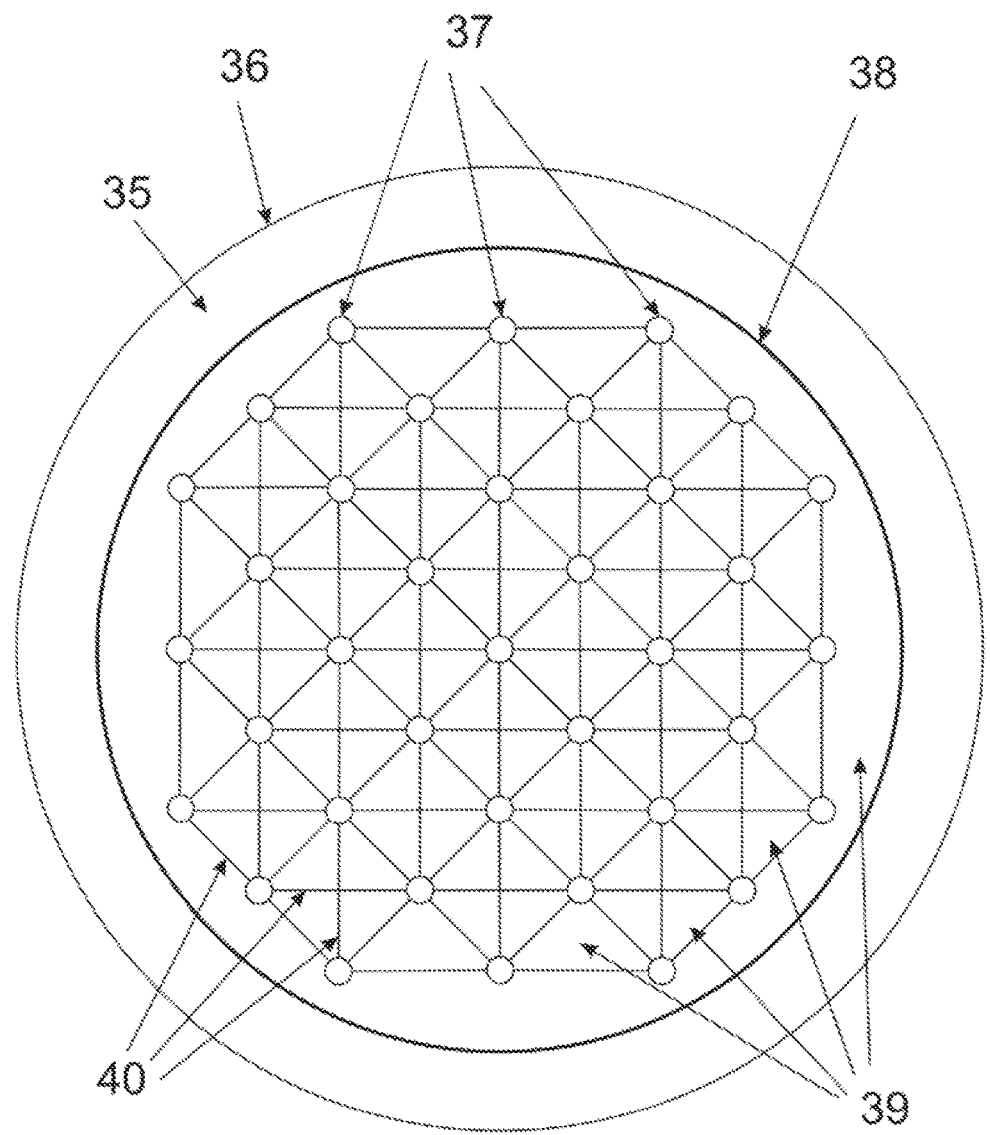
FIG. 14 shows the top view of the heat storage unit as viewed from above if the top portion was cut off along section BB clearly showing how the pipes, heat fins and sand are located.

The final section of the primary loop is the heat storage unit. It is essential to have a storage system which can provide several days of backup in the event of plant shutdown, prolonged cloud cover, or maintenance. A few hours of backup is just not acceptable which is unfortunately the acceptable standard today. The basic design of the heat storage unit is shown in FIGS. 13, 14, 15 & 16. FIG. 13 shows the basic outside view of the heat storage unit. Hot gas enters the heat storage unit and exits after depositing some of its energy into the sand 39 inside. The temperature inside the heat storage unit is expected to vary between a maximum of 1000° K and a minimum of 800° K. In FIG. 14, the top portion of the heat storage has been cut off along section BB so as to show the internal arrangements better. The top portion of the heat storage unit which is not shown is the portion where the pipes simply connect to each other and the inlet and outlet pipe connections to the primary loop. The heat storage media will be sand 39. There are huge advantages in using sand as the heat storage media. The first of course is the cost benefit. With a medium that is virtually free, the entire cost or the storage unit is easily kept within acceptable limits. With sand being extremely stable even at elevated temperatures, safety is naturally enhanced. There are no chances of any undesirable runaway chemical reaction that could be catastrophic when the media is in large quantity and is already at 1000° Kelvin. In addition, being a solid, containment is much easier in the event of any unforeseen disaster. There is also no pollution or toxic material of any type even after many years at elevated temperatures.

The heat storage capacity of sand may not be as high as a lot of other materials with respect to weight, but due to the reasonably high density of sand, it is quite respectable when comparing its heat capacity with respect to volume. In addition, most materials which have a better volumetric heat storage capacity than sand undergo a phase change or thermal decomposition long before the 1000 plus degree Kelvin requirement and can, therefore, not be used. The amount of energy stored in any material will be proportional to the temperature. The higher the temperature, the more the energy stored Therefore, 1 cubic meter of sand at 1000° can store a very sizeable amount of energy (approximately 1 billion joules). Therefore, even a small storage unit of say 100 m×100 m×100 m would be able to store enough energy to power a large city for a day.

Using a solid powder as the heat storage medium has its advantages and disadvantages but any such disadvantages have been used as advantage in the present invention. Any hot object loses heat from only the surface and so it is better to have a single large storage unit as opposed to multiple smaller ones of the same total capacity since the heat losses would be less. In other words, you would ideally want the smallest possible surface area to volume ratio possible to minimize heat losses. It's also always much cheaper to build one single unit than have ten smaller ones of the same total capacity as the single one. A large heat storage unit will have to be well insulated to keep energy losses to a minimum. Most insulators consist of fibrous materials that conduct poorly and trap air in small pockets and have very low density. They are not able to take much compressive loads. The side walls and top are easily insulated but the bottom is not so easy to insulate due to the large weight of the sand. And due to the high temperatures involved, any support structure would be very expensive to build. This is where the poor thermal conductivity of sand is an advantage. The heat storage unit will simply have a thick buffer of sand 46 at the bottom that will act as the insulator. This allows for heat storage units of any size to be built which is not possible with current designs. In addition, the cost would also be much lower than any existing designs. In the case of small heat storage units (say a few thousand cubic meters) it is necessary to insulate the sides in order to keep heat losses within acceptable limits. However, once the heat storage unit is in the million cubic meters range or higher, no insulation is required as the sand surrounding the heat storage unit will insulate it very well.

The basic design of the heat storage unit is shown in FIGS. 13, 14, 15, & 16. It is basically just a vertical cylinder 38 with pipes 37 connected together with fins 40 inside and the empty spaces filled with sand 39. A second larger cylinder 36 encloses the entire heat storage unit and the empty space between the two cylinders 36 & 38 is filled with high temperature insulation 35. The small grains of sand in odd shapes will mean that only a small fraction of the actual surface area of the fins 40 will be in contact with the sand thereby limiting heat transfer by conduction. This is, however, not going to be a problem due to the high operating temperature. The advantage of operating at temperatures around 1000° K is the heat transfer due to radiation becomes very large and even a 50° K temperature difference results in a significant energy transfer. Another advantage of using sand is the very high emissivity which allows for efficient transfer of radiation in both directions (from fins 40 to sand 39 during the day and sand 39 to fins 40 during the night). However, the poor thermal conductivity of sand reduces the rate at which energy transfers through the sand can take place and this is the reason why the fins 40 are much larger than they would have to be if the thermal conductivity was good. In this respect, Graphite would be a much better medium than sand, however, the very high cost of Graphite rules it out.

The heat storage unit is not a pressurised vessel and it will operate at atmospheric pressure. This is an obvious advantage of using a solid as the heat storage media as a non pressurised vessel can be made of any size. In fact, if desired it can also be kept at slightly below atmospheric pressure to offset the pressure the sand would exert on the outer walls 38 of the steel containment unit. The air inside the heat storage unit will be an inert gas like argon or helium so as to reduce the chances of oxidation of the metal pipes 37 and fins 40. The sides and top of the heat storage cylinder are insulated with a thick layer of high temperature insulation 35 to keep energy losses to a minimum. A thick layer of sand buffer 46 on the bottom will help ensure minimal heat losses from the bottom face. The outer face 38 of the heat storage cylinder will be plated with gold to reduce heat losses due to radiation. This is surrounded by vertical rectangular pipes sealed at both ends with a vacuum and multi layer insulation inside the pipes. Since the rectangular pipes will touch each other, the only heat loss through the pipes will be due to conduction in the pipe walls.

There may, however, be short periods where the power requirements are very high and for this there is a second smaller heat storage unit that is made of a solid cylinder of mild steel (FIG. 16). Mild steel has a reasonable heat storage capacity, can operate at very high temperatures, is reasonably cheap, and has a much better thermal conductivity then sand. Therefore, whenever there is a sudden requirement for a large surge in power for short periods, this steel core would be able to provide it. It is basically just a solid block of iron 42 in the shape of a cylinder or any other appropriate shape surrounded by high temperature insulation 43 on the top and sides with channels through it to allow for coolant flow 41. The bottom insulation is provided by having a cavity 44 that is filled with fibrous high temperature insulation. This cavity 44 if pressurised with argon gas so that the entire weight of the iron core heat storage unit is supported by this pressurised gas cavity. The pressure in cavity 44 will exactly balance the weight of the iron core heat storage unit above it so that it is effectively floating on a blanket of air. The semi circle bend 45 will allow for minor movements due to any imbalance. This will provide excellent insulation at a very low cost.

During the day, the hot Helium from the solar array first passes through the heat storage unit and deposits some of its energy here. After exiting the heat storage unit, the helium then goes to a heat exchanger where it heats water for the turbines. The cooled Helium then returns to the solar array where it is reheated. At night a cut-off valve prevents helium from returning to the solar array and is circulated so as to collect energy from the heat storage unit and transfer it to the heat exchanger of the secondary loop. All the coolant loops are closed loops and there will be no mixing of any of the coolants at any stage.

The above description of the solar power plant is meant to give the basic ideas that are meant to be used. One must understand that there may be minor modifications and changes without departing from the basic ideas described above. The transformation of a theoretical idea into a practical working machine always requires some minor adjustments and innovations.

Advantages
1) Very small fixed concentrated sunlight receiver which never moves.
2) A very small solar receiver enclosed in a vacuum to provide for minimum re-radiation losses.
3) Helium coolant in primary loop for corrosion free and high temperature operation.
4) Raised dishes to provide for service from below.
5) Dishes which are almost touching to get maximum sunlight collection per unit area.
6) Entire primary loop pipe enclosed in vacuum surrounded by specially designed multi layer reflective insulation to ensure minimum radiation losses.
7) All welded joints with provision for thermal expansion and contraction.
8) Composite sheet light weight front sided mirror dish using thin sheet of material such acrylic, PVC or other suitable material with a thin sheet of metal for structural strength which can be formed in the required shape easily allowing for cheap, fast, and very large scale production.
9) Square shaped parabolic dishes to cover maximum area.
10) Anti collision provision designed into dish movement.
11) The primary coolant pipes system provides the only support the parabolic dishes have.
12) If any failure occurs in the primary loop, self sealing design will ensure that only a very small section of the loop will malfunction and the plant will continue functioning at almost full capacity.
13) Automatic dust removal system to minimize dust deposition on dishes using air ionization and filters to capture dust.
14) Automatic dish cleaning using an automated dry cleaning system thereby saving water and reducing labour costs.
15) Wind protection by using strategically placed dust filters.
16) Natural convection air cooling system to remove waste heat thereby eliminating huge water consumption of all power plants.
17) Maintaining ambient air temperature in desirable range in spite of significant energy removal
18) Entire plant having no water requirement, therefore, allowing for setting up plants in the driest and most inhospitable and remote deserts.

19) Enclosed transparent air tight housing for areas where rain is very frequent.
20) Rail mounted cleaning system to wash the protective housing.
21) The plant design ensures the dishes require much less cleaning through the entire life of the plant.
22) Sand and steel heat storage unit allowing for very low heat storage construction cost.
23) Single heat storage unit of any size and capacity can be built.
24) Heat storage unit that can operate at extremely high temperatures.
25) Secondary Steel core heat storage unit which can provide for high power ramp up in very short time.
26) 24 hour a day, 365 days per year power generation capacity.
27) No need for fossil power plant back up.
28) Sufficient heat storage to run for days in the event of continuous cloud cover or other natural uncontrollable event.

The invention claimed is:

1. A system for electrical power generation and heat storage at high temperatures in the range of at least 700-1000 K, said power being generated from solar energy wherein said system comprises:
   a primary loop, said primary loop comprising at least one solar array and at least one heat storage unit whereby said heat storage unit is capable of receiving and storing thermal energy from said solar array; and
   a secondary loop operatively communicating with said primary loop;
   wherein said solar array comprises a plurality of reflector dish assemblies each comprising a reflector dish having a reflective surface and a receiver located inside a substantially transparent enclosure with a space between said receiver and the transparent enclosure being a vacuum, said receiver being hermetically protected inside said enclosure and receiving and absorbing sunlight reflected by said dish whereby said plurality of dish assemblies are arranged in close proximity to each other with no spacing between them with a distance between a focal point of each dish reflective surface and a center of each dish being equal to or less than one fourth of the diameter of the dish;
   wherein each dish comprises a plurality of flexible detachable portions.

2. The system according to claim 1 wherein said reflector dish assembly further comprises:
   one or more dual piping tubular structural members for supporting said dish;
   said structural members comprising:
   two tubular hollow supports substantially vertically arranged and spaced from each other such that said dish is movable corresponding to a position of the sun;
   another tubular structure being held substantially horizontally at its both ends by said two tubular supports;
   wherein each of said tubular supports comprises plural pipes concentrically disposed inside said tubular supports, said pipes being connected in series so as to allow the hot water to pass through the tubular supports allowing for dissipation of waste heat and keeping the air temperature around the dishes above the condensation point of water;
   wherein said horizontal tubular structure comprises another inner pipe, said inner pipe being hermetically disposed inside a vacuum, said horizontal tubular structure being joined with a receiver located inside a transparent enclosure, said receiver being hermetically protected inside said enclosure and adapted to receive and absorb a majority of the sunlight reflected by said dish;
   said inner pipe having a multi layer vacuum insulation arrangement all along and around the vacuum space available between the outer surface of said inner pipe and the inner surface of the horizontal tubular structure and
   wherein said inner pipe comprises angular bends for expansion or contraction allowance while permitting single continuous pipes by means of all welded joints in the entire solar array and defines passage for an inert gas to flow through said receiver thereby carrying away the heat collected at the receiver to the inner pipe of the next dish of the assembly until said inert gas reaches a desired temperature at which said inert hot gas is sent to the heat storage unit and heat exchangers of the secondary loop.

3. The system according to claim 2, wherein said tubular structural member further comprises a pipe substantially perpendicular to said horizontal outer tubular structure and located at about the center of said horizontal outer tube.

4. The system according to claim 2, wherein the entire dual piping tubular structural member and receiver are fixed in all dimensions and cannot move or rotate.

5. The system according to claim 2, further comprising a multi layer shield for said inner pipe wherein the multilayer shield serves a dual function of heat insulation and support for the inner pipe system while preventing contact between the inner and the outer pipes.

6. The system according to claim 2, wherein said multi layer thermal radiation insulation arrangement comprises a sheet of metal having poor thermal conductivity and good reflectivity rolled up to form a coil having multiple layers of the metal sheet such that an separation gap/distance is maintained between two layers.

7. The system according to claim 6, wherein said sheet of metal comprises a plurality of dimple like protrusions preventing any of the layers from coming into contact with each other.

8. The system according to claim 6 optionally consisting of a series of hollow cylinders having different diameters placed one inside the other made of sheet metal with dimple like protrusions to prevent the individual cylinders from touching.

9. The system according to claim 2, wherein each reflector dish assembly further comprises at least one motor drive located on the vertical hollow support above the receiver that controls the movement of said reflector dish about different axes; and a microprocessor controlled circuit to control said at least one motor drive for moving the reflector dish corresponding to the position of the sun such that the sun light is on to the receiver for a maximum period of time.

10. The system according to claim 2, wherein each reflector dish assembly comprises support discs located inside the horizontal tubular structure so as to support the inner pipes.

11. The system according to claim 2, wherein each reflector dish assembly further comprises plural discs for providing support to the inner pipes disposed in the horizontal outer tubular structure.

12. The system according to claim 11, wherein said disc comprises bi-directional low heat conducting cut-out valves to insure vacuum integrity in the primary loop in case of damage to any section of the primary loop.

13. The system according to claim 1, wherein said dish is a composite sheet having a thickness under 1 mm comprising a smooth surface material bonded onto a supporting metal sheet in a parabolic profile for strength and having no additional support structure for strength.

14. The system according to claim 13, wherein said smooth surface sheet comprises a front side mirror protected with a microscopic silicon dioxide coating.

15. The system according to claim 1, wherein said receiver is located at the focal point of each dish reflective surface.

16. The system according to claim 1, wherein said receiver is a spherical metal blackbody having a diameter so as to permit concentration ratios above 1000 times and connected to the inner pipes in the primary loop and surrounded by a transparent enclosure with a space between the receiver and the transparent enclosure being a vacuum.

17. The system according to claim 1 further comprising arrangements for protecting the system from dust, said arrangement comprising:
- vertical positively charged filter means surrounding said dish assembly such that there is no obstruction to the incoming solar radiation while they are effective in catching most dust particles and reducing the wind speed to substantially zero; and
- air ionizer means comprising plural ion discharge pins, said ionizer means being placed on said substantially vertical tubular support means.

18. The system according to claim 17, wherein the reflector dishes are negatively charged to repel negatively charged dust.

19. The system according to claim 1 further comprising dry cleaning mechanisms whereby each of said dry cleaning mechanism being provided in the each dish assembly, said cleaning mechanism comprising:
- one or more arm means fixed on the dish and of the same profile as the dish shape wherein said arm means being provided with one or more cleaning materials; and
- one or more motor means operatively connected to said arm means for driving said arm means as required.

20. The system according to claim 19, wherein said mechanism comprises air hose means whereby said air hose means being operatively fixed to said arm means such that controlled air pressure is maintained during rotation of the arm means.

21. The system according to claim 1, wherein said heat storage unit is adapted to operate at atmospheric pressure, said heat storage unit comprising:
- a first cylindrical body;
- a second cylindrical body larger than said first cylindrical body, said second cylindrical body substantially concentrically enclosing said first cylindrical body leaving a predetermined space inbetween;
- a plurality of metal pipe means each of which being connected to each other by fin means, said plurality of pipe means being disposed inside the said first cylindrical body in a manner to form multiple segments with the aid of said fin means for accommodating heat transfer from or to storage media.

22. The system according to claim 21, wherein said heat storage unit further comprises high temperature multi layer insulations in the space inbetween the said first and second cylindrical bodies.

23. The system according to claim 21, wherein said heat storage media in the heat storage unit comprises sand.

24. The system according to claim 21, wherein said heat storage unit contains an inert gas comprising argon or helium so as to reduce chances of oxidation of the pipe means.

25. The system according to claim 21, wherein said heat storage unit further comprises multi layer insulation at its top and bottom sides.

26. The system according to claim 1 additionally comprising a second high speed energy transfer heat storage unit made of a solid cylinder of iron or mild steel with channels to allow flow of heat transfer medium, said heat storage unit having a pressurized cavity filled with fibrous high temperature insulation for top and bottom insulation and an iron or steel core to store thermal energy.

27. The system according to claim 1 wherein the heat storage unit is adapted to operate at atmospheric pressure, said unit comprising:
- a first cylindrical body;
- a second cylindrical body larger than said first cylindrical body, said second cylindrical body substantially concentrically enclosing the said first cylindrical body leaving a predetermined space inbetween;
- plurality of metal pipes each of which being connected to each other by fins, said plurality of pipes being disposed inside said first cylindrical body in a manner to form multiple segments with the aid of said fins for accommodating heat storage media.

28. The system according to claim 27 further comprising high temperature insulations in the space inbetween said first and second cylindrical bodies.

29. The system according to claim 27, wherein said heat storage media in the heat storage unit comprises sand.

30. The system according to claim 27, wherein the heat storage unit includes inert gases so as to reduce chances of oxidation of the pipes.

31. The system according to claim 27, wherein the heat storage unit further comprises insulation at its top and bottom sides.

* * * * *